United States Patent
Whyte et al.

(10) Patent No.: US 12,407,879 B2
(45) Date of Patent: *Sep. 2, 2025

(54) CACHE MANAGEMENT IN A VIDEO CONTENT DISTRIBUTION NETWORK

(71) Applicant: Comcast Cable Communications, LLC, Philadelphia, PA (US)

(72) Inventors: Volnie Whyte, Wynnewood, PA (US); Amit Garg, Delran, NJ (US); Tom Brown, West Chester, PA (US); Robert Gaydos, Harleysville, PA (US); Mark Muehl, Bryn Mawr, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/317,526

(22) Filed: May 11, 2021

(65) Prior Publication Data

US 2022/0103876 A1    Mar. 31, 2022

Related U.S. Application Data

(63) Continuation of application No. 16/899,234, filed on Jun. 11, 2020, now Pat. No. 11,039,176, which is a
(Continued)

(51) Int. Cl.
*H04N 7/173*    (2011.01)
*G06F 12/0871*    (2016.01)
(Continued)

(52) U.S. Cl.
CPC ... *H04N 21/23103* (2013.01); *G06F 12/0871* (2013.01); *G06F 12/121* (2013.01);
(Continued)

(58) Field of Classification Search
CPC ......... H04N 21/23103; H04N 7/17336; H04N 21/222; H04N 21/23106; H04N 21/23113;
(Continued)

(56) References Cited

U.S. PATENT DOCUMENTS 5,291,343 A    3/1994 Goto
5,369,533 A    11/1994 Ottesen et al.
(Continued)

FOREIGN PATENT DOCUMENTS

WO    02/39258 A2    5/2002

OTHER PUBLICATIONS

Extended European Search Report, EP11194614.1, dated: Jul. 26, 2012.
(Continued)

*Primary Examiner* — Annan Q Shang
(74) *Attorney, Agent, or Firm* — Banner & Witcoff, Ltd.

(57) ABSTRACT

Cache management techniques are described for a content distribution network (CDN), for example, a video on demand (VOD) system supporting user requests and delivery of video content. A preferred cache size may be calculated for one or more cache devices in the CDN, for example, based on a maximum cache memory size, a bandwidth availability associated with the CDN, and a title dispersion calculation determined by the user requests within the CDN. After establishing the cache with a set of assets (e.g., video content), an asset replacement algorithm may be executed at one or more cache devices in the CDN. When a determination is made that a new asset should be added to a full cache, a multi-factor comparative analysis may be performed on the assets currently residing in the cache, comparing the popularity and size of assets and
(Continued)

combinations of assets, along with other factors to determine which assets should be replaced in the cache device.

36 Claims, 10 Drawing Sheets

Related U.S. Application Data continuation of application No. 14/512,901, filed on Oct. 13, 2014, now Pat. No. 10,721,501, which is a continuation of application No. 12/973,156, filed on Dec. 20, 2010, now Pat. No. 8,863,204.

(51) Int. Cl.
| | |
|---|---|
| *G06F 12/121* | (2016.01) |
| *H04N 21/222* | (2011.01) |
| *H04N 21/231* | (2011.01) |
| *H04N 21/239* | (2011.01) |
| *H04N 21/24* | (2011.01) |
| *H04N 21/472* | (2011.01) |
| *G06F 12/0888* | (2016.01) |

(52) U.S. Cl.
CPC ....... *H04N 7/17336* (2013.01); *H04N 21/222* (2013.01); *H04N 21/23106* (2013.01); *H04N 21/23113* (2013.01); *H04N 21/2393* (2013.01); *H04N 21/2402* (2013.01); *H04N 21/2407* (2013.01); *H04N 21/2408* (2013.01); *H04N 21/47202* (2013.01); *G06F 12/0888* (2013.01); *G06F 2212/263* (2013.01); *G06F 2212/284* (2013.01)

(58) Field of Classification Search
CPC .......... H04N 21/2393; H04N 21/2402; H04N 21/2407; H04N 21/2408; H04N 21/47202; G06F 12/0871; G06F 12/121; G06F 12/0888; G06F 2212/263; G06F 2212/284

See application file for complete search history.

(56) References Cited

U.S. PATENT DOCUMENTS

| | | | |
|---|---|---|---|
| 5,446,919 | A | 8/1995 | Wilkins |
| 5,721,815 | A | 2/1998 | Ottesen et al. |
| 5,721,956 | A | 2/1998 | Martin et al. |
| 5,878,078 | A | 3/1999 | Griffin et al. |
| 6,292,834 | B1 | 9/2001 | Ravi et al. |
| 6,842,719 | B1 | 1/2005 | Fitzpatrick et al. |
| 7,028,096 | B1 | 4/2006 | Lee |
| 7,774,440 | B1 | 8/2010 | Bagrodia et al. |
| 7,860,820 | B1 | 12/2010 | Rajkumar et al. |
| 7,921,024 | B2* | 4/2011 | Hogan ............... G06Q 10/0639 705/7.22 |
| 7,926,079 | B2 | 4/2011 | Lebar |
| 8,036,227 | B2 | 10/2011 | Zuberi et al. |
| 8,296,458 | B2 | 10/2012 | Kwapniewski et al. |
| 8,474,001 | B2 | 6/2013 | Thompson et al. |
| 8,966,033 | B2 | 2/2015 | Van der Merwe et al. |
| 2002/0087797 | A1 | 7/2002 | Adrangi |
| 2002/0111878 | A1 | 8/2002 | Namba et al. |
| 2002/0198756 | A1 | 12/2002 | Ghaisas et al. |
| 2003/0005457 | A1 | 1/2003 | Faibish et al. |
| 2003/0195791 | A1 | 10/2003 | Waller et al. |
| 2004/0010588 | A1* | 1/2004 | Slater ................. H04N 21/2181 725/98 |
| 2004/0230994 | A1 | 11/2004 | Urdang et al. |
| 2004/0261094 | A1 | 12/2004 | Huslak et al. |
| 2005/0138165 | A1 | 6/2005 | Tang et al. |
| 2006/0072148 | A1 | 4/2006 | Kovnat et al. |
| 2006/0277152 | A1 | 12/2006 | Hirotsune |
| 2008/0046116 | A1 | 2/2008 | Khan et al. |
| 2008/0259799 | A1 | 10/2008 | van Beek |
| 2008/0271039 | A1 | 10/2008 | Rolia et al. |
| 2009/0055467 | A1 | 2/2009 | Petersen |
| 2009/0119375 | A1 | 5/2009 | Shenfield |
| 2009/0198358 | A1 | 8/2009 | Logan et al. |
| 2010/0057576 | A1 | 3/2010 | Brodersen et al. |
| 2010/0057894 | A1 | 3/2010 | Glasser |
| 2011/0013514 | A1 | 1/2011 | Mahkonen |
| 2011/0029392 | A1 | 2/2011 | Brown |
| 2011/0082946 | A1 | 4/2011 | Gopalakrishnan |
| 2011/0083069 | A1 | 4/2011 | Paul et al. |
| 2011/0107030 | A1* | 5/2011 | Borst ............... H04N 21/23106 711/E12.001 |
| 2012/0137336 | A1 | 5/2012 | Applegate et al. |
| 2012/0151042 | A1 | 6/2012 | Garg et al. |
| 2012/0311652 | A1 | 12/2012 | Garg et al. |
| 2013/0104175 | A1* | 4/2013 | Applegate ........ H04N 21/23113 725/87 |
| 2013/0144750 | A1* | 6/2013 | Brown ............... G06Q 30/0631 705/26.7 |
| 2014/0082212 | A1 | 3/2014 | Garg et al. |
| 2021/0185368 | A1* | 6/2021 | Hao ................... H04N 21/8456 |

OTHER PUBLICATIONS

European Office Action—EP Appl. 11194614.1—dated Mar. 17, 2016.
Oct. 24, 2017—Canadian Office Action—CA 2,762,456.
Oct. 18, 2018—Canadian Office Action—CA 2,762,456.
Nov. 27, 2019—Canadian Office Action—CA 2,762,456.
Saam Acharya; MiddleMan: A Video Caching Proxy Server; Department of Science Cornell University, Ithaca, (Year: 2000).
Aug. 19, 2021—Canadian Office Action—CA 2,762,456.
Jul. 25, 2022—CA Office Action—CA App. No. 2,762,456.

\* cited by examiner

| | SIZE (1020) | TIME (1030) | TITLE (1040) | ASSET TYPE (1050) | #REQ EDGE (1060) | #REQ DAYPART (1070) | #REQ TOTAL (1080) | SD/HD (1090) | ... |
|---|---|---|---|---|---|---|---|---|---|
| 1001 | 92.3GB | 2:18:03 | Forrest Gump | Movie (Drama) | 145 | 52 | 6,570 | HD | |
| 1002 | 22.7GB | 1:45:58 | It's a Wonderful Life | Movie (Drama) | 71 | 4 | 3,091 | SD | |
| 1003 | 18.4GB | 1:38:18 | Psycho | Movie (Horror) | 54 | 35 | 891 | SD | |
| 1004 | 76.1GB | 2:02:29 | Bonnie and Clyde | Movie (Action) | 48 | 12 | 2,568 | HD | |
| 1005 | 341MB | 0:04:13 | Hungry Like The Wolf | Music Video | 60 | 25 | 5,782 | SD | |
| 1006 | 1.1GB | 0:03:49 | Love Song | Music Video | 17 | 13 | 581 | HD | |
| 1007 | 260MB | 0:04:02 | No Diggity | Music Video | 14 | 11 | 434 | SD | |
| 1008 | 1.2GB | 0:05:33 | Billy Jean | Music Video | 32 | 24 | 1,095 | HD | |
| 1009 | 10.8GB | 0:53:38 | Lost (Sea. 3, Ep. 2) | TV (Drama) | 156 | 44 | 8,938 | SD | |
| 1010 | 9.6GB | 0:52:17 | Lost (Sea. 3, Ep. 3) | TV (Drama) | 872 | 378 | 20,442 | SD | |
| 1011 | 8.7GB | 0:14:49 | Yoga Morning | TV (Fitness) | 177 | 3 | 8,709 | HD | |
| 1012 | 234MB | N/A | Chess Masters | Software (Game) | 122 | 18 | 5,575 | N/A | ... |

FIG. 10

CACHE MANAGEMENT IN A VIDEO CONTENT DISTRIBUTION NETWORK

CROSS-REFERENCE TO RELATED APPLICATIONS

This application is a continuation of U.S. patent application Ser. No. 16/899,234, filed on Jun. 11, 2020, which is a continuation of U.S. patent application Ser. No. 14/512,901 (now U.S. Pat. No. 10,721,501), filed Oct. 13, 2014, which is a continuation of U.S. patent application Ser. No. 12/973,156, filed on Dec. 20, 2010 (now U.S. Pat. No. 8,863,204). Each of the above-referenced applications is hereby incorporated by reference in its entirety.

BACKGROUND

Video on demand (VOD) systems typically provide video content, such as movies, television programming, and music videos, to users from a content library via a dedicated system of computers known as a content distribution network (CDN). In many VOD systems, users may order movies or other video content from their homes via client devices including set-top boxes, and the video content is delivered by streaming the data over a communication network from a video content library stored in one of the computers in the CDN. To avoid excess network loads, especially during peak content ordering times, VOD systems may use CDNs that have a network of local caches spread out geographically across the CDN so that users may receive their requested video content from a nearby source. These local caches, also known as 'edge caches,' typically store only a small subset of the total video content available in the VOD system. Therefore, it is desirable for the local caches to store the most popular video content, the content most likely to be requested by the users of the local caches in the near future. Similarly, it is desirable not to cache obscure and rarely requested video content in the VOD system, since cache space is limited and the network cost of streaming rarely requested titles is relatively minor compared to streaming more popular titles.

In a VOD system, establishing and operating the local caches in the CDN is an expensive proposition. The costs associated with local caches include the devices themselves, the maintenance of the devices, memory upgrades, and the network bandwidth costs associated with the local caches throughout the CDN. The costs of purchasing, installing, and operating local caches in a CDN increase further if the caches are not properly sized. For example, if a video content provider implements a larger cache than is necessary or more bandwidth than is necessary for a local cache, the video content provider has misused money on unused resources. On the other hand, if a local cache is not adequately sized, the CDN might not be able to respond to user requests at peak times, causing user dissatisfaction and revenue loses for the video content provider.

In many conventional systems, the sizes of the local caches in a VOD CDN are scaled linearly as the amount of content in the VOD system increases. However, research regarding the viewing habits of VOD users shows that a linear increase in the content available in a VOD system does not result in a linear increase in network bandwidth usage or optimal cache size. Thus, many VOD systems may waste substantial time and money unnecessarily replicating video content in many different local caches, even though much of that video content will be minimally viewed and should not have been cached.

An additional challenge in VOD systems relates to intelligently caching video content assets in the local caches, in order to respond to user requests more efficiently in systems having large amounts of VOD content. Many conventional systems implement a "most recently requested" algorithm at the local cache, in which the least recently requested video content assets will be discarded from the cache to make room for newly requested assets. However, the "most recently requested" approach is not optimal in many scenarios. One problem with this approach is that it assumes that the cost of delivering a VOD asset to a local cache (e.g., from a central content library or middle-tier server in the CDN) is the same for every asset in the VOD system. This assumption is false in modern VOD systems, because the video content assets may vary significantly in play length (e.g., movies, television episodes, music videos, games) and bit rate (e.g., standard definition and high definition). These factors result in highly variable asset sizes, and similarly to highly variable network costs for retrieving the different sized assets.

BRIEF SUMMARY

The following presents a simplified summary in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the disclosure relate to cache management techniques for content distribution networks (CDNs), for example, video on demand (VOD) systems that support requests and delivery of video content to users of the VOD. According to certain aspects, a preferred cache size may be calculated for one or more cache devices in the CDN. For example, a cache size for an edge cache device in a VOD CDN may be based on the bandwidth availability serving the edge cache device within the CDN, title dispersion data determined by an analysis of the user requests for video content at the edge cache device or within a larger portion of the CDN, and a maximum cache memory size of the edge cache device. Determining the preferred cache size may include calculating the maximum number of assets (e.g., individual items of video content) that are transferrable over the CDN in a certain period of time, and calculating the minimum number of assets required to be stored in the edge cache device based on estimates derived from the title dispersion data of the number of unique titles that are likely to be requested at the edge cache device over the same period of time. In certain implementations, the CDN may comprise a multi-tiered video delivery architecture, and the bandwidth availability determinations may correspond to content transfers between an edge cache device and a middle-tier cache device and/or a central content library of the CDN.

According to additional aspects, the title dispersion data used to determine preferred cache size may comprise a title dispersion value, for example, the number of unique assets requested at the edge cache device over a time period, or may comprise a title dispersion function corresponding to a request distribution curve for titles in a central content library. Then, after the preferred cache size is determined for the edge cache device or other caches in the CDN, the cache may be configured to operate according this preferred cache size.

According to further aspects, after a cache is established at a cache device in the CDN and filled with video content assets, the cache device may be configured to implement an asset replacement algorithm to determine when a newly requested asset should be added to the cache, and which assets currently residing in the cache should be removed. Asset replacement algorithms in accordance with certain aspects may include a multi-factor comparative analysis on the currently cached assets, during which calculations relating to the popularity and size of the cached assets are performed, along with other calculations, to identify an asset or combinations of assets that should be removed from the cache device. For example, the popularity of the cached assets may be compared based on the number of user requests for the assets received at the edge cache and/or based on the number of requests for the asset at higher-level cache devices in the CDN, over one or more relevant time windows. Accordingly to additional aspects, the size and popularity of related assets may be used in the asset replacement algorithm, for example, corresponding asset titles having different bit rates (e.g., standard definition and high definition), related assets (e.g., different episodes of the same television program), or the popularity of the same assets in different caches and/or different geographic regions in the CDN. According to additional aspects, the asset replacement algorithm may remove a single asset, or a combination of assets, from the cache based on a size distribution analysis of the assets currently residing in the cache.

The methods and systems of the above-referenced embodiments may also include other additional elements, steps, computer-executable instructions, or computer-readable media or data structures. In this regard, other embodiments are disclosed and claimed herein as well.

The details of these and other embodiments are set forth in the accompanying drawings and the description below. Other features and advantages will be apparent from the description and drawings, and from the claims.

BRIEF DESCRIPTION OF THE DRAWINGS

The present disclosure is illustrated by way of example, but not limited to, the accompanying figures, in which like reference numerals indicate similar elements.

FIG. 10 is a table showing an illustrative data set corresponding to assets stored in a cache in a content distribution network in accordance with one or more aspects described herein.

DETAILED DESCRIPTION

Figure 1:
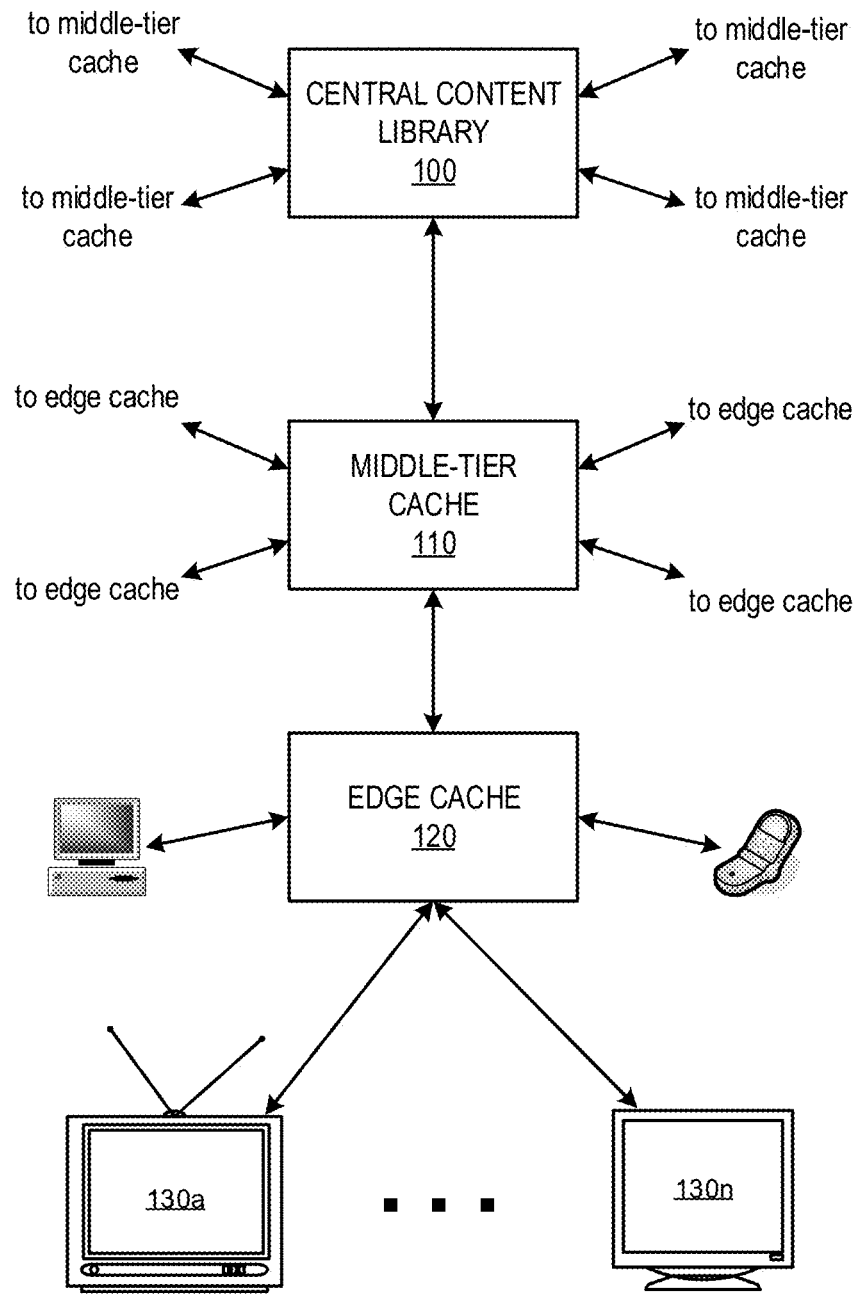
FIG. 1 is a block diagram showing selected elements of a content distribution network in accordance with one or more aspects described herein.

To provide large on demand libraries, system operators must manage and maintain increasingly complex content distribution networks (CDNs). For example, FIG. 1 is a block diagram showing elements of a content distribution network that may store and distribute content (e.g., video content, audio content, software, data, applications, other network resources, etc.) to users throughout the network. A central content library 100 (e.g., central facility or head end) may include VOD servers, servers for receiving and encapsulating VOD assets, management servers, etc. In this example, the central content library 100 may store all of the content available in the content distribution network, and may distribute the content via multiple middle-tier caching devices 110 (e.g., regional head ends). The central content library 100 may communicate with the middle-tier caches 110 over a backbone network such as a national backbone network, with the middle-tier caches 110 also including facilities for VOD and programming reception/encapsulation. Each middle-tier cache 110 may communicate over an access network, such as a regional access network, with one or more edge caches 120 (e.g., local caches). Each edge cache 120 may provide an associated set of client device 130a-130n (e.g., equipment of customers, subscribers, service purchasers, users, etc.) with access to the middle tier cache 110 and the central content library 100.

Thus, the content distribution network in this example is a centralized network including a hierarchical three-tier caching architecture, so that each client device 130a-130n communicates only with its assigned edge cache 120, and each edge cache 120 communicates only with its associated middle-tier cache 110. However, in other content distribution networks, different architectures and configurations may be used. For instance, a non-centralized content distribution network may comprise multiple different content libraries 100 that service different geographic regions. Such multiple content libraries 100 may each comprise a complete content library, or may each store only a subset of the entire library of the VOD system and retrieve content from the other content libraries 100 when needed via network data transfers. Additionally, although a hierarchical three-tier caching architecture is shown in this example, it should be understood that a different number of caching levels or network architectures may be used (e.g., two-tier, three-tier, four-tier, five-tier, etc.). In any of these examples, the various servers and devices of the content distribution network may be connected via a data network, which may be any type of distribution or access network, such as a coaxial cable network, hybrid fiber cable network, fiber network, telephone network, wireless or satellite network, etc.

In this example, each edge cache device 120 may provide VOD services for an associated geographic region of client devices 130a-130n. As shown in FIG. 1, each client device 130a-130n may be connected to the edge cache 120, and may be for example, a set-top box, display device, computer, or mobile device, along with their incorporated or corresponding receiving/display devices (e.g., television, computer display, mobile device display screen, etc.). In certain implementations, the client devices 130a-130n may include Internet Protocol (IP) based components, and may be used to communicate with the using IP communication with other local IP devices (e.g., via a LAN) and/or remote IP devices. In another aspect, a service provider may allow a client device 130n to access websites and other content providers connected to a network, such as the Internet (i.e., WAN). The network may also include one or more cellular networks and/or a public-switched telephone network (PSTN). The network may be available to the various devices shown in FIG. 1 to communicate and send information to and from one another.

Accordingly, each of the client devices 130a-130n may include computing devices and video/audio equipment, such as data servers, computers, processors, security encryption and decryption apparatuses or systems, processing equipment (e.g., provider operated user account processing servers), television service transceivers (e.g., transceivers for standard broadcast television and radio, digital television, HDTV, audio, MP3, text messaging, gaming, etc.), and the like configured to communicate via the content distribution network and provide content data. The term asset used herein refers to an item of media content transferable via a content distribution network. Content may include any type of media including video, audio, print, and interactive media such as software applications. For example, content items may include audiovisual media such as television programming, movies, interviews, news shows; audio media including sound bits, music, books-on-tape; visual media (e.g., video content or textual data) such as news reports, articles, books, magazines, and the like; and interactive media including software applications such as games, educational programs, and collaborative online applications.

Figure 2:
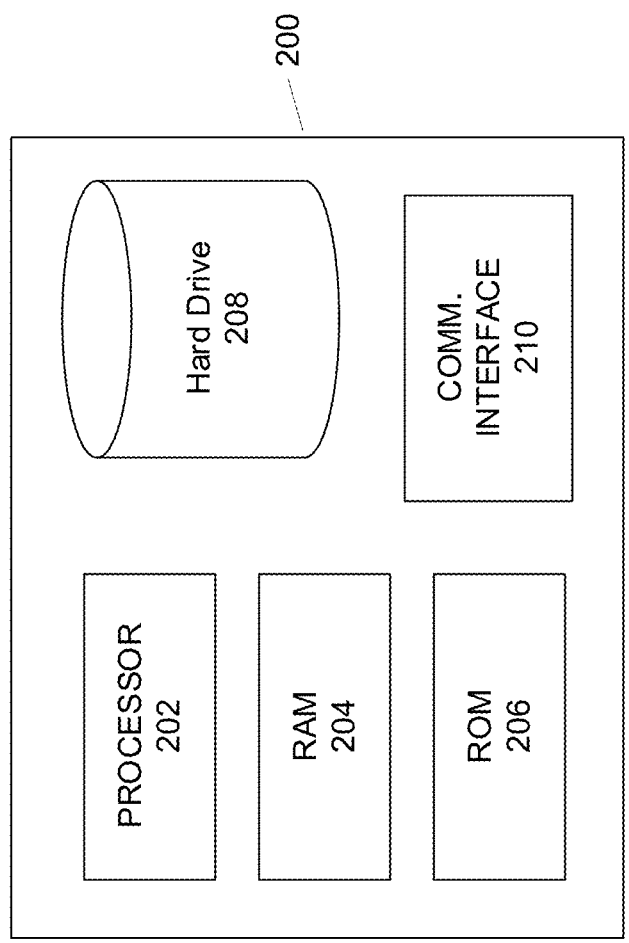
FIG. 2 is a block diagram showing an illustrative cache device in accordance with one or more aspects described herein.

FIG. 2 illustrates a block diagram of a computing device 200 that may perform the various features described herein, such as those of an edge cache 120, middle-tier cache 110, content library 100, client device 130n, and various other servers and devices in the content distribution network. The device 200 (e.g., an edge cache 120) may include a processor 202 configured to execute instructions stored on one or more computer-readable media, such as random access memory (RAM) 204, read only memory (ROM) 206 and hard drive 208. The memories may store computer-executable instructions that cause the processor 202 and device 200 to operate in the manner described herein. Storage in hard drive 208 may be configured to store a variety of the assets of the content distribution network, as well application programming used to receive assets (e.g., from content library 100 via an associated middle-tier cache 110) and to provide assets to users, and may include user preference information, program listings, media recording schedules, and the like.

The device 200 may also include communication interface 210, which may include any desired type of hardware and/or software interface used to communicate with other devices in the content distribution network. For example, interface 210 may include any appropriate hard-wired (e.g., twisted pair, coaxial cable, fiber optic cable, hybrid fiber cable, etc.) or wireless (e.g., radio frequency, microwave, infrared, etc.) coupling and protocol (e.g., Home Plug, HomePNA, IEEE 802.11(a-b), Bluetooth, HomeRF, etc.) to meet the design criteria of a particular application and/or network.

Figure 3:
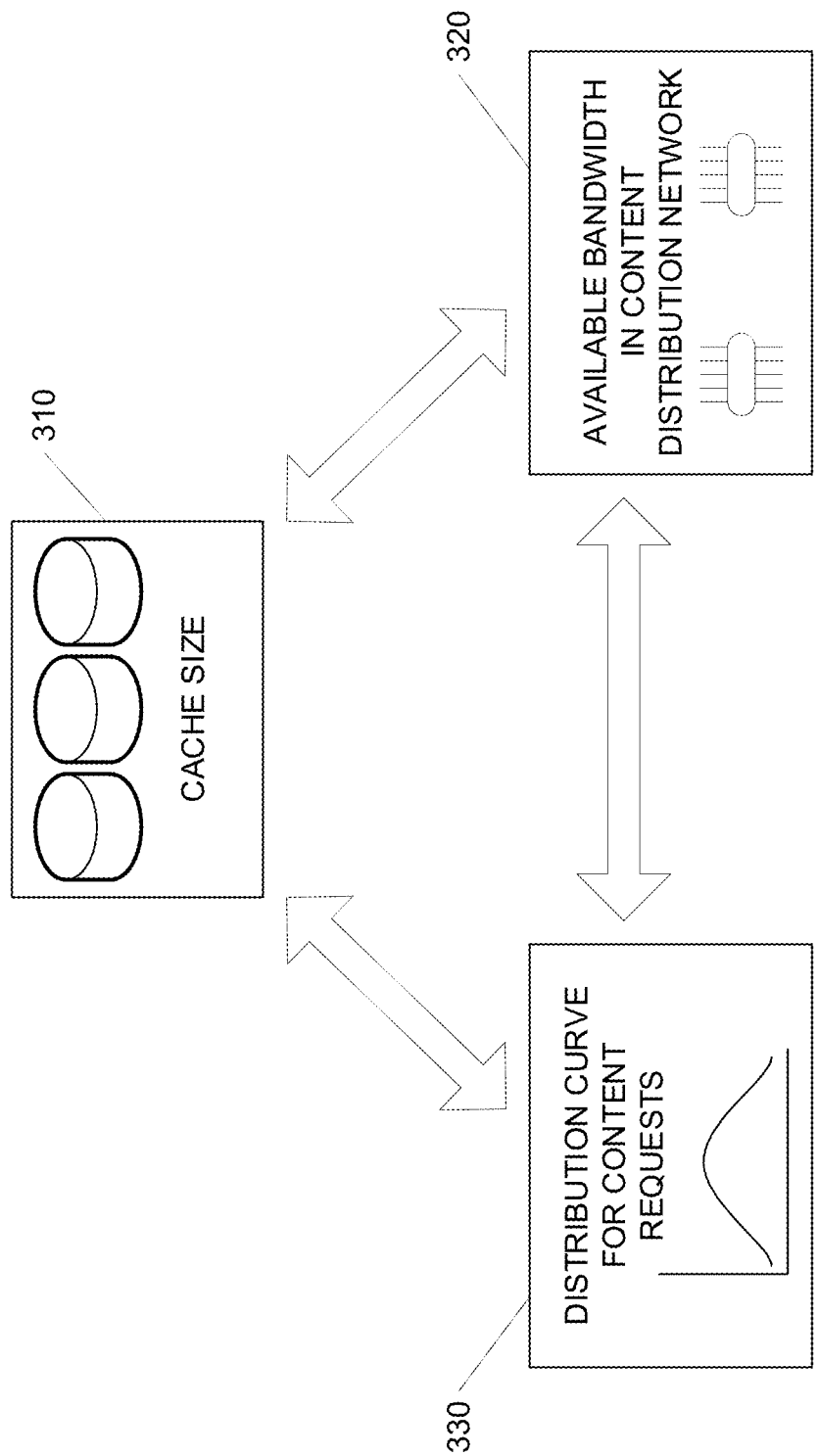
FIG. 3 is a block diagram showing components and processes of cache management in accordance with one or more aspects described herein.

Referring now to FIG. 3, a block component diagram is shown illustrating relating factors of cache management in accordance with certain aspects of the disclosure. When performing cache management and operation functions (e.g., determining a preferred cache size as described below in reference to FIG. 4) and configuring caches and related devices, the relationship between the factors 310-330 in FIG. 3 may affect such functions. As described below, if the caching factors 310-330 are not properly configured and/or proportioned with respect to each other, the caching architecture and system may be wasteful and inefficient. Additionally, although the diagram in FIG. 3 shows the three factors 310-330, it should be understood that additional factors may be considered when performing cache management functions and configuring caches and related devices (e.g., hardware and network costs, anticipated future system requirements, customer satisfaction and usability). Thus, the techniques described below in relation to factors 310-330 may be used with respect to other cache management factors as well.

Factor 310 corresponds to cache size, for example, the amount of hard disk space 208 or other memory storage dedicated to storing cached assets at a cache device (e.g., edge cache 120). It should be understood that certain memory at a cache device may be dedicated for non-caching purposes (e.g., application programming, server management, etc.), and that different cache devices may have different sized caches. For example, in an illustrative content distribution network, each of the middle-tier caches 110 may include 500 TB of memory dedicated to storing cached assets from the content library 100, while each of the edge caches 120 may include 100 TB dedicated to storing cached assets from its associated middle-tier cache 110.

Factor 320 corresponds to the available bandwidth in the content distribution network. More specifically, when performing an analysis on an edge cache 120, factor 320 may refer to the bandwidth available for transferring assets to or from that edge cache 120. For example, in a hub-spoke CDN architecture, such as the illustrative CDN architecture shown in FIG. 1, factor 320 may correspond to bandwidth available to transfer an asset from the central content library 100 to the edge cache 120. As another example, if a different CDN architecture is implemented in which an edge server 120 may receive assets from other edge servers or other CDN resources, then factor 320 may correspond to an available bandwidth between the edge server 120 and the other edge servers or other CDN resources. Additionally, an entity providing VOD services may have limited bandwidth between the central content library 100 and the middle-tier caches 110 and edge caches 120. When the amount of VOD data traffic in the CDN exceeds the purchased bandwidth, the content provider may incur additional costs and/or might not be able to provide requested content to users.

Factor 330 corresponds to a distribution curve for VOD content requests within the content distribution network. For a specific edge cache 120, the distribution curve factor 330 may represent the "title dispersion" of content requests from the client devices 130a-130n of that edge cache 120. For example, at an edge cache 120, it may be observed that the 100 most popular assets (as determined, for example, by the number of client requests over a period of time) constitute 50% of all of the VOD requests received from client devices 130a-130n at the edge cache 120. At another edge cache 120, a relatively wider distribution curve may be observed in which the 100 most popular assets constitute only 20% of the VOD requests over a period of time. Of course, these examples are not distribution curves, but are individual title dispersion data points that could be used to form a distribution curve by including additional title dispersion data points (e.g., the number of assets needed for top 1%, 2%, . . . , 100% of client device requests). Thus, a title dispersion function corresponding to a distribution curve may be accessed to retrieve a specific title dispersion value (e.g., a number of assets based on a desired percentage of requests to be handled at a cache device).

In other examples, the distribution curve values may be expressed in percentages (e.g., the top 5% of titles account for 75% of client device requests), or data (e.g., the top 1 TB of stored assets constitutes 50% of client device requests, or using other well known techniques for expressing statistical distribution suitable for data caching). For instance, at an edge cache 120, it may be observed that the 20% of the VOD requests received from the client devices 130a-130n correspond to the 100 most popular titles. At another edge cache 120, a relatively narrower distribution curve may be observed in which 20% of the VOD requests received from the client devices 130a-130n correspond to the 18 most popular titles. In these examples, additional distribution curve values may be considered for the less popular titles as well, for instance, determining the number of titles corresponding to the next 20% of VOD requests, and so on, in order to determine the level of diffusion of interest within the set of assets at the edge cache 120. The distribution curve for VOD content requests may also include an associated time window (e.g., data corresponding to title dispersion of client device requests over an hour, several hours, a day, etc.). In certain examples, title dispersion data may be statistically determined for a peak client device request time in a VOD system. For instance, if 7 pm-10 pm is identified as the peak content request time for a VOD system (e.g., based on a periodic count of user streams at the edge cache 120), then the title dispersion data during that time period may be identified as particularly relevant for determining a preferred cache size, configuring the cache devices, etc.

Figure 6:
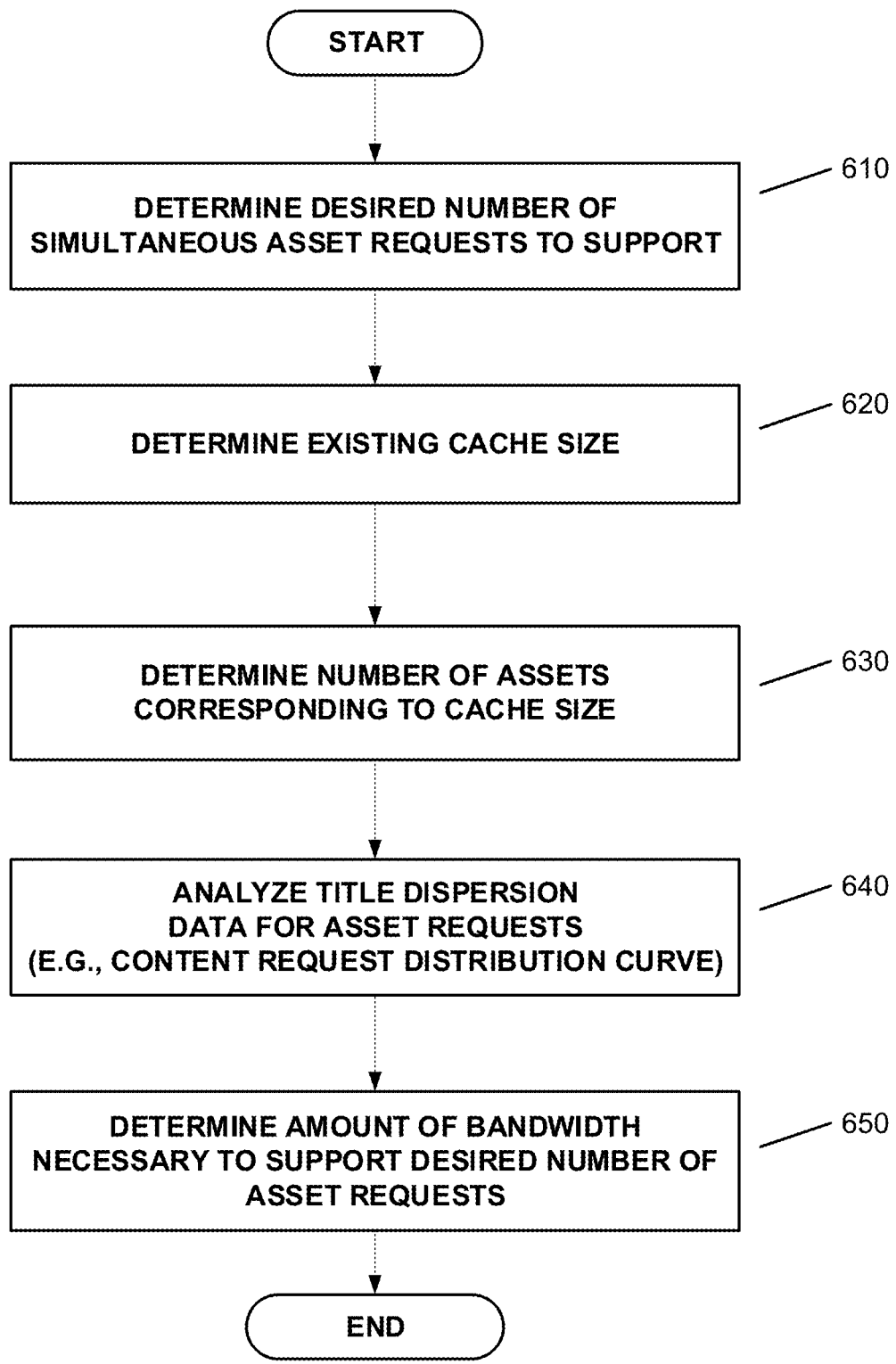
FIG. 6 is a flow diagram showing an illustrative method for determining a preferred amount of bandwidth with respect to a cache device in a content distribution network in accordance with one or more aspects described herein.
Figure 7:
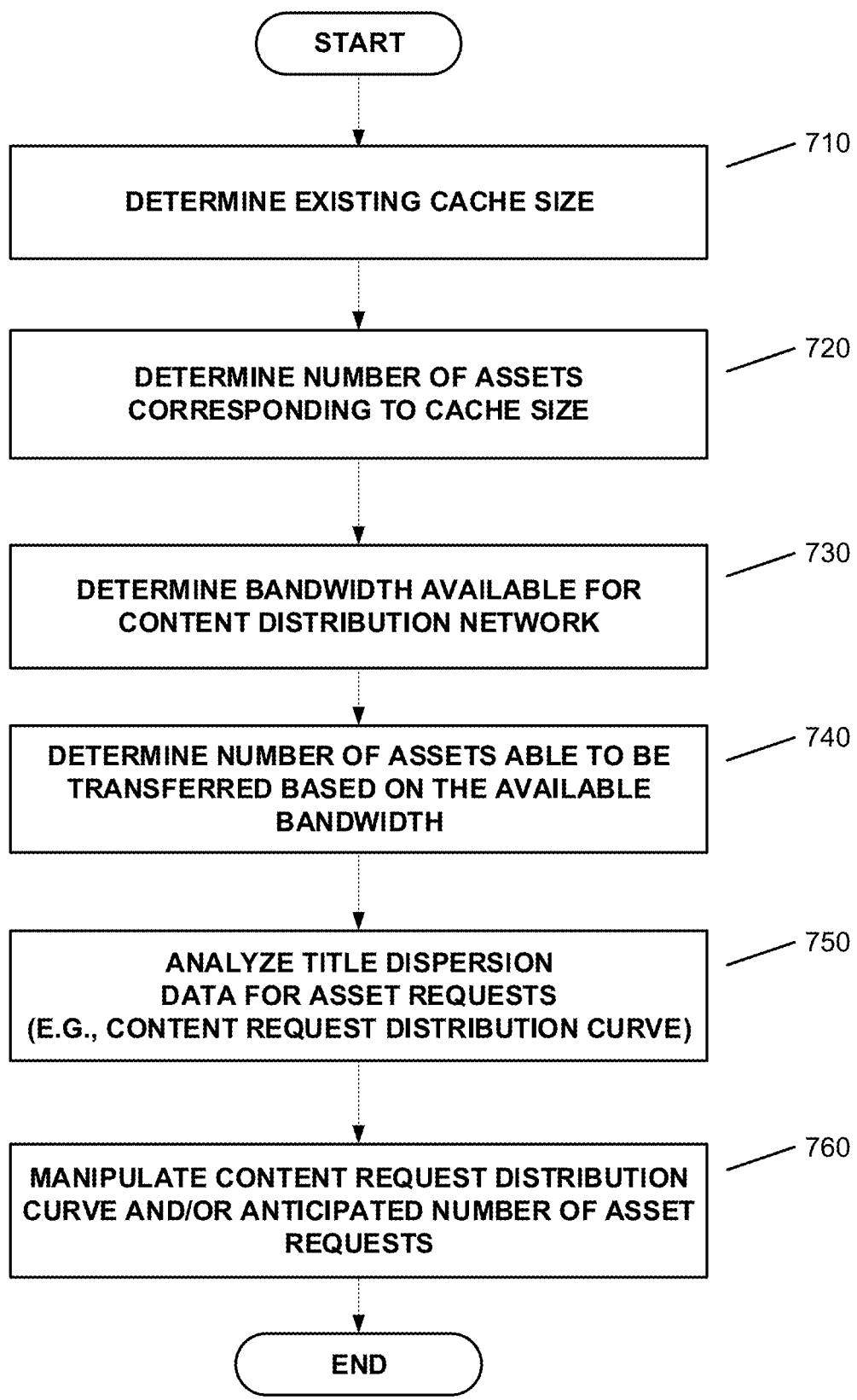
FIG. 7 is a flow diagram showing an illustrative method for manipulating a content request distribution curve and/or an anticipated number of asset requests in a content distribution network in accordance with one or more aspects described herein.

As mentioned above, cache size 310, available bandwidth 320, and the distribution curve of content requests 330 may be related factors that may be considered and/or controlled when configuring cache devices (e.g., 110, 120) and performing other cache management functions. In certain CDN systems, two of the factors 310-330 may be fixed in order to "solve" for the third factor. For example, as described in more detail below in reference to FIG. 4, assuming a fixed given amount of available bandwidth 320 and a given content request distribution curve 330, a preferred (or recommended) cache size 310 may be determined for a cache device in a CDN. In FIG. 6, another example is shown in which a given fixed cache size 310 and a given content request distribution curve 330 are assumed, and a preferred (or recommended) bandwidth 320 may be determined for the edge cache 120 in the CDN. In FIG. 7, yet another example is shown in which a given fixed cache size 310 and a fixed given amount of available bandwidth 320 are assumed, and a content request distribution curve 330 is analyzed in order to potentially manipulate the content request distribution curve 330 and/or an anticipated number of asset requests that will be handled by the content distribution network.

Thus, as shown in these and other examples, a VOD system or other content distribution network with caching may be configured to operate more efficiently and/or cost effectively by manipulating one or more of the factors 310-330 and treating the other factors as fixed. For example, a VOD system implemented via a CDN with an insufficiently sized edge cache device 120 may require many repetitive and costly retrievals of assets that use excessive bandwidth in the CDN. Conversely, an unnecessary large cache size may be wasteful due to the expense associated with the larger edge cache device 120 and because available bandwidth will not be used. Similar inefficiencies might result if an unnecessary excess of bandwidth were purchased (e.g., additional costs), or an insufficient amount of bandwidth were purchased (e.g., unable to respond to client device requests). Additionally, although a distribution curve for content requests 330 in a VOD system or other CDN can not be purchased and controlled in the same manner as cache size 310 or available bandwidth 320, a content request distribution curve may potentially be controlled using other techniques, such as limiting the number of assets in the content library 100 or providing incentives to client devices 130a-130n by pricing or advertising certain assets making assets more or less likely to be requested in the CDN. In other examples, the popularity of certain assets may be controlled by making the assets easier or harder to locate and/or purchase within a user menu of the VOD system, thereby potentially affecting the shape of the content request distribution curve.

Figure 4:
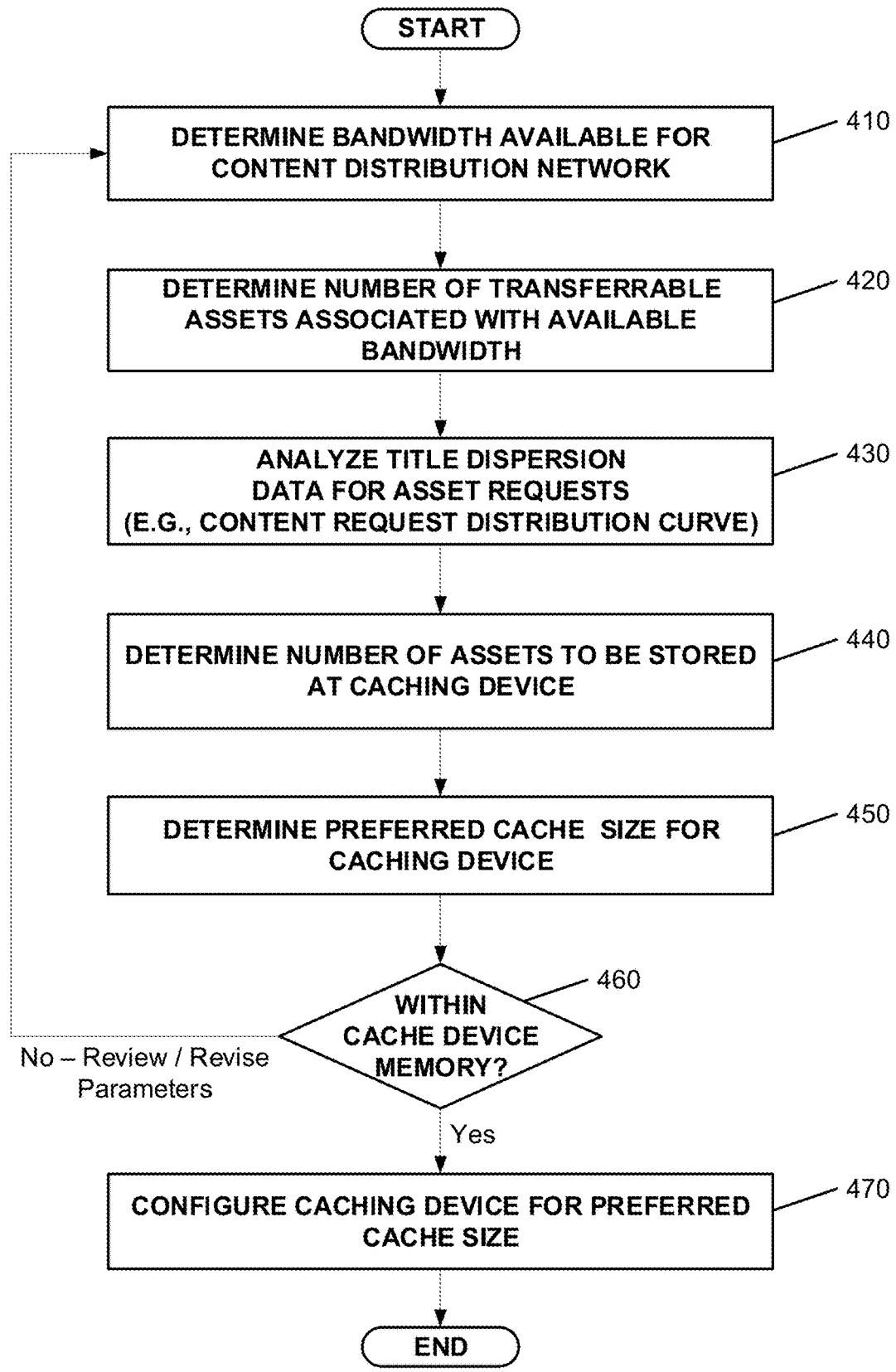
FIG. 4 is a flow diagram showing an illustrative method for determining a preferred size for a cache device in a content distribution network in accordance with one or more aspects described herein.

Referring now to FIG. 4, a flow diagram is shown illustrating a method for determining a preferred (or recommended) cache size in accordance with certain aspects of the disclosure. As used herein, the term preferred cache size (or recommended cache size) is meant to refer to a cache size determined based on at least bandwidth availability and at least title dispersion. In FIG. 4, the cache size determination examples may relate to one or more of the cache devices in the content distribution network of FIG. 1, such as the edge cache devices 120 and/or middle-tier cache devices 110. In other network architectures, similar methods or techniques may be used to make determinations of preferred cache size for the cache devices in any multi-tiered CDN.

In step 410, a determination is made regarding the amount of available bandwidth within the content distribution network. The relevant available bandwidth determination of step 410 may be, for example, the bandwidth between the edge cache 120 and the rest of the CDN. As mentioned above, the determination of a preferred cache size in FIG. 4 may relate to a single cache device (e.g., edge cache 120). For example, in the illustrative architecture of FIG. 1, the bandwidth determination of step 410 may correspond to the available bandwidth between the edge cache 120 and the central content library 100, or between the edge cache 120 and the middle-tier cache 110, or a combination of these different bandwidths based on probability of needing to retrieve a requested asset from the central content library 100. Similar available bandwidth determinations may be made in different CDN architectures.

A variety of techniques may be employed to make the available bandwidth determination of step 410. For example, the determination may be based on an arrangement with a physical network provider (e.g., national backbone data network) or network service provider. Certain data network arrangement or contracts may specify the allowable bandwidth usage for users, and users exceeding the bandwidth may be subject to fees and/or rate increases, or may have their network usage interrupted. In other implementations, the available bandwidth determination may depend on the physical capabilities of the relevant communication pathways in, to, or from the CDN. For example, the determination in step 410 may be based on statistical data compiled from previous data transfer rates and bandwidths (e.g., measured delays and throughput during previous asset transfers along the same path in the CDN).

Additionally, as discussed above, in certain examples the available bandwidth determination 410 may be determined for a peak network usage time. For example, in a video on demand system implemented in a CDN, the peak network usage may correspond to prime television viewing hours (e.g., 7 pm-10 pm). In other examples, the peak network usage time may be determined by throughput measurements and/or empirical network testing at a variety of different times in an hour, day, week, month, or year, etc. Available bandwidth determinations in step 410 may be calculated based on network usage at one or more specific time instances or over ranges of times. For example, a current network usage calculation may be performed periodically on a certain schedule throughout the day, and the highest measured network usage value may be used for the available bandwidth determination in step 410. In another example, the bandwidth availability may be determined in step 410 based on the network usage over a longer time range (e.g., hour or daypart). In a VOD system or various other CDN implementations, the peak network time may vary depending on the day of the week, date of the month, season, and other factors, therefore, a peak usage time may be expressed as a variable and/or a dynamically changing value that is recalculated periodically for different caching devices during the operation of the CDN.

In step 420 in this example, the determination of available bandwidth in step 410 is used (alone or in combination with other criteria) to determine a corresponding number (or rate) of assets transferrable to the edge cache 120. For example, if a determination is made that N Megabits per second (Mbps) are available to the edge cache 120 at a peak usage time, then the number of assets that may be simultaneously streamed to the edge cache 120 during that peak time can be calculated simply from the average asset available bandwidth and the average asset streaming rate.

Bandwidth/Average Asset Streaming
Rate=Simultaneously Streamed Assets   Equation 1:

For instance, assuming an available bandwidth of 500 Mbps and an average asset streaming rate of 5 Mbps: 500 Mbps/5 Mbps=100 assets streamed simultaneously In this example, the determination in step 420 may reveal that the edge cache 120 could receive 100 streamed assets simultaneously from the content library 100 during peak CDN usage.

In step 430, an analysis is performed of title dispersion data for asset requests in the CDN. Title dispersion, or request dispersion, may measure the number of unique asset titles in comparison to the total number of asset requests. For example, a title dispersion analysis may determine that the 100 most popular assets (titles) account for 75% of all asset requests received at a first edge cache 120. However, at a different edge cache 120 serving customers with a broader range of preferences, the title dispersion analysis may determine that the 100 most popular titles only account for 15% of the requests. Thus, title dispersion analyses may be performed at the edge cache 120, a middle-tier cache 110, or at the central content library 100 to measure the overall title dispersion across the VOD system. The title dispersion analysis in step 430 may also correspond to a specific time frame, for example, the peak time used in the available bandwidth determination of step 410. For instance, it is possible that at a peak weekday request time in a VOD system (e.g., 7 pm-10 pm), the top 5% of titles may account for 80% of the overall requests at an edge cache 120, however, during a less peak time period (e.g., 12 am-3 am), the top 5% of titles may only account for 20% of the overall requests.

As discussed above, the results of the title dispersion analysis in step 430 may take the form of a single number or value (e.g., the top X titles=Y % of requests), or a percentage (e.g., the top X % of titles=Y % of requests). Additionally, the title dispersion analysis may generate one or more distribution curves and/or equations to provide more comprehensive title dispersion data. For instance, an analysis in step 430 may determine the percentage of overall requests corresponding to the top 1 percent, 2 percent, 3 percent, and so on, of requested titles in the VOD system. Thus, a set of multiple title dispersion data points (e.g., every percent, every ten percent, every quartile, etc.), may allow for the generation of a title dispersion distribution curve and/or a title dispersion equation, whereby the curve/equation could receive either a number or percentage of most popular titles and then provide the percent of overall requests accounted for that those titles (e.g., what percentage of requests correspond to the top 100 titles?). Conversely, similar title dispersion distribution curves or equations may be used to determine the number or percentage of most popular titles, given the percentage of overall requests (e.g., how many titles must be stored in the cache to handle 50% of the requests locally?).

In step 440, a preferred number of assets to be stored locally at the edge cache 120 may be calculated based on, for example, at least (1) an expected request rate at the edge cache 120, (2) the available rate of asset transfers determined in step 420, and/or (3) the title dispersion analysis data of step 430. For example, if (1) a determination is made based (e.g., based on past VOD request statistics) that an expected 500 VOD asset requests per hour will be received at the edge cache 120 during a peak time in a VOD system, and if (2) in step 420 a determination is made that 100 assets per hour (e.g., assuming a predetermined average asset size) can be retrieved from the central content library 100 and provided to an edge cache 120 at the peak time, and if (3) a determination is made using the title dispersion analysis data of step 430 (e.g., a title dispersion equation), that the most popular 150 titles in the content library 100 will account for 80% of the requests received by the edge cache 120 during the peak time, then 150 is the preferred number of assets to be stored locally at the edge cache 120. That is, because the edge cache 120 will receive 500 requests per hour, and can only service 100 of those requests from the content library 100, then the remaining 400 assets (80%) should preferably be stored locally in the edge cache 120. If, as another example, the title dispersion equation in step 430 determined that the most popular 10% of assets accounted for 80% of all asset requests, then in step 440 the preferred cache size would be the size sufficient to hold the most popular 10% of assets.

In step 450, the corresponding cache memory size for the edge cache 120 is calculated based on the number of assets determined in step 440. In certain examples, the cache memory size calculation may simply multiply the determined number of assets times the average asset size (e.g., in MB or GB). For example, if in step 440 the determination is made that 250 assets should be cached at the edge cache 120, then in step 450 a predetermined average asset size (e.g., 20 GB) may be used to determine the preferred cache size (e.g., 5,000 GB) for the edge cache 120. As another example, if in step 440 a determination is made that the edge cache 120 should preferably cache the most popular 5% of the assets in the content library 100, then the size determination in step 405 may include identifying the sizes of each of these most popular assets (e.g., by querying the content library 100), and summing the sizes to determine the preferred cache size.

In step 460, it is determined whether the size of the edge cache 120 (or other memory device) is sufficient for the preferred cache size calculated in step 450. If the size of the edge cache 120 is not sufficient (460:No), the CDN or associated controller may review and/or revise one or more of the above-discussed parameters. For example, CDN administrators may take steps to increase the amount of bandwidth available within the CDN (e.g., by revising a contract with a network service provider), thus affecting subsequent determinations in step 410. In other examples, CDN administrators may take steps to affect subsequent title dispersion determinations in step 430, for instance, by adding/removing titles from the central content library 100, or influencing demand by changing the advertising efforts and/or raising or lowering prices for certain titles. In other examples, CDN administrators may increase or decrease the number of middle-tier caches 110, edge caches 120, and/or may increase or decrease the cache memory sizes at these cache devices, so that the preferred cache size determined in step 450 can be supported by the edge cache 120. Then, as illustrated in FIG. 4, after one or more of the above-discussed changes have been made to the CDN, and after the relevant variables and/or statistics (e.g., new title dispersion statistics) have been calculated, then steps 410-460 may be repeated until it is determined that there is sufficient memory within the edge cache 120 to support the preferred cache size determined in the most recent execution of step 450.

When it is determined in step 460 that the edge cache 120 does have sufficient storage space for the preferred cache size determined in step 450 (460:Yes), then in step 470 the edge cache 120 may be configured (or re-configured) according to the preferred cache size. For example, step 470 may comprise installing more or less memory at edge cache 120, or installing a new edge cache 120 based on the preferred cache size calculation. Additionally, the configuring in step 470 may comprise partitioning and/or designating a portion of the memory of the edge cache 120 for caching assets in the CDN, while freeing up additional memory for other uses and allowing the asset cache in edge cache 120 to operate more efficiently.

Figure 5:
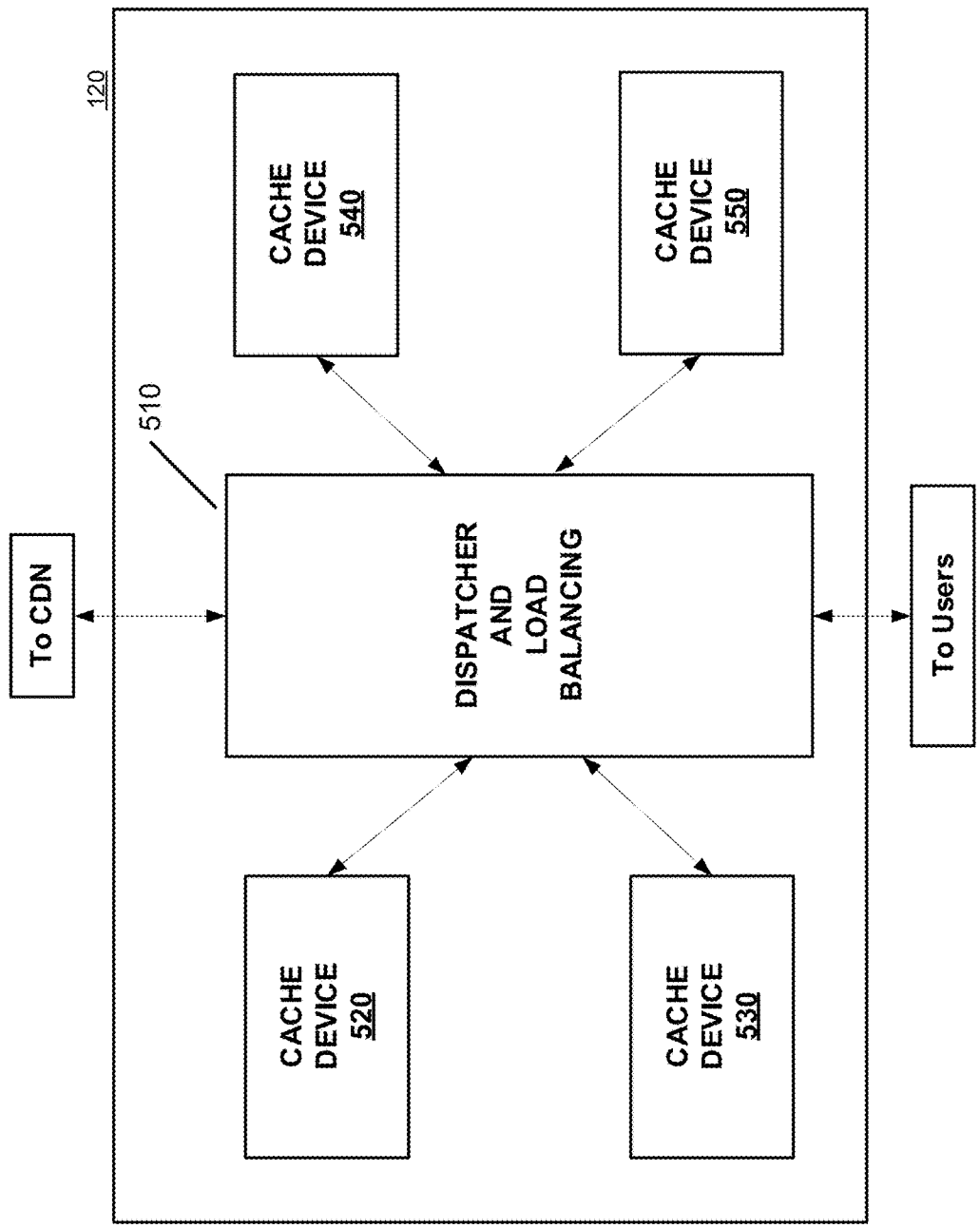
FIG. 5 is a block diagram showing selected elements of an illustrative cache device in accordance with one or more aspects described herein.

Referring now to FIG. 5, a block diagram is shown representing an illustrative caching device, for example, an edge cache 120. As discussed above in reference to FIG. 4, certain caching devices may be selected for use in a CDN based on the size of the cache's memory, and certain caches may be resized, configured, or re-configured, based on a determination of a preferred (or recommended) size for the cache device. In some examples, these techniques may be performed using a device similar to the edge cache device 120 shown in FIG. 5, including illustrative components 510-550 to allow the edge cache 120 to be implemented in a customized manner, resized, configured, or reconfigured, according to a preferred cache size. Edge cache 120 of FIG. 5 includes a controller, such as a dispatcher, and load balancing component 510 configured to communicate with the CDN (e.g., to request and receive non-cached assets from the central content library 100), and to communicate with client devices 130a-130n (e.g., to receive and respond to VOD assets requests). The edge cache 120 in this example also includes four separate caches 520-550, each of which may be controlled by the dispatcher 510 to store assets (and/or remove stored assets) upon request. The dispatcher 510 may also perform load balancing functionality between the separate cache devices 520-550. Thus, when a determination is made that an asset should be stored at the edge 120, the dispatcher 510 may determine which of the cache devices 520-550 should store the asset, and the dispatcher 510 may route the asset to that cache for storing. For load balancing purposes, and in order to respond to asset requests, the dispatcher 510 may maintain a database indicating which assets are stored at each cache 520-550 and the amount of unused storage space in each cache device 520-550. In certain embodiments, the determinations that an asset should be removed from the edge cache 120 are made by the dispatcher 510, while in other embodiments the determinations to remove assets may be made, at least in part, by the separate cache devices 520-550. Many other principles and techniques of dispatching, routing, and load balancing among multiple connected components, which will be understood by those skilled in the art, may also be incorporated within the edge cache devices 120 as described herein.

By using a cache device such as the illustrative edge cache 120 shown in FIG. 5, it may be possible to more easily to construct, customize, configure, or reconfigure caches in a CDN according to a preferred cache size determination. For example, based on an available bandwidth at the edge cache device 120, and an analysis of a content request distribution curve for the edge cache device 120, a determination may be made that a recommended edge cache size should preferably be able to store 400 average-sized assets in the CDN VOD system. In the example shown in FIG. 5, an edge cache 120 capable of storing 400 assets may be constructed using a dispatcher/load balancer 510 and four separate caches 520-550, each capable of storing 100 average-sized assets. The edge cache 120 may then be potentially resized or reconfigured based on a change in bandwidth availability, a change in the number of assets in the central content library 100 and/or a change in the content request distribution curve, or based on a business decision by a provider of the CDN VOD system to provide a higher or lower quality of service to users. For example, if additional users move into the geographic area serviced by the edge cache 120, and thus the expected number of content requests increases, then and it may be recommended to increase the size of the edge cache 120 by installing another separate cache device (e.g., 520-550) at the same location. In other example, if the amount of bandwidth available to the edge cache 120 increased, then it may be possible to remove a separate cache device (e.g., 520-550) from the edge cache 120 while maintaining the same level of service to users.

Referring now to FIG. 6, a flow diagram is shown illustrating a technique for determining a preferred amount of bandwidth with respect to a cache device in a content distribution network. As discussed above, cache size 310, available bandwidth 320, and the distribution curve of content requests 330, for example, may be related with respect to a cache device (e.g., 110 or 120) in a CDN so that two of the factors 310-330 may be fixed in order to "solve" for the third factor. Thus, in FIG. 6, an illustrative method is shown in which the size at an edge cache 120 is assumed to be fixed, and the content request distribution curve with respect to the edge cache 120 is assumed to be fixed, thereby allowing a determination of an amount of bandwidth that may be preferred or recommended at the edge cache 120.

In step 610, the number of simultaneous asset requests desired to be supported at the edge cache (or another device) is determined. For example, a VOD CDN manager may determine that a certain edge cache 120 should support 400 simultaneous asset requests from its client devices. The number in this example may be determined, for example, based on the number of client devices associated with the edge cache, an estimated peak usage by the client devices, and/or a desired level of service for the VOD CDN customers, as well as other factors. After the determination in step 610, the existing cache size of edge cache 120 is determined in step 620, and the number of assets corresponding to this cache size is determined in step 630. For example, if edge cache 120 is 1 TB in size (step 620), and a determination is made that the average asset size in the content library is 5 GB, then the edge cache 120 can store 200 average-sized assets (step 630). In step 640, the title dispersion data is analyzed with respect to the edge cache 120, which may involve a similar analysis described above in step 430 of FIG. 4. Thus, the analysis in step 640 may involve accessing a content request distribution curve or executing an equation based on such a curve to determine percentage of content requests associated with a fixed number of asset titles, or vice versa. In this example, in step 640 a title dispersion function may be used to determine that the 200 most popular assets (i.e., the number of assets capable of being stored in the 1 TB storage of the edge cache 120) correspond to 60% of the content requests received at edge cache 120. Thus, 40% of the 400 simultaneous asset requests, or 160 asset requests, may need to be retrieved (e.g., streamed) from the central content library 100 (or middle-tier cache 110). Finally, in step 650, the necessary amount of bandwidth to support the desired number of simultaneous asset requests may be calculated. In this example, the desired amount of bandwidth at the edge cache 120 (i.e., the amount required to support 400 simultaneous asset requests) would correspond to a streaming bandwidth of 160 assets from the content library 100 to the edge cache 120.

As described above, after determining a preferred amount of bandwidth with respect to a cache device in a content distribution network in 610-650, a system administrator of the VOD CDN may change the bandwidth available to edge cache 120 accordingly. For example, additional bandwidth may be purchased from a network provider, or excess bandwidth may be sold. Thus, in the illustrative example shown in FIG. 6, a CDN may be configured by determining a desired bandwidth amount at the cache level (e.g., 110 or 120) and changing the bandwidth accordingly, without needing to resize the cache devices, or manipulate the content distribution curve, and without effecting the desired level of customer service and/or library size.

Referring now to FIG. 7, a flow diagram is shown illustrating a technique for manipulating a content request distribution curve and/or an anticipated number of asset requests in a content distribution network. As discussed above, cache size 310, available bandwidth 320, and the distribution curve of content requests 330 may be related with respect to a cache device (e.g., 110 or 120) in a CDN so that two of the factors 310-330 may be fixed in order to "solve" for the third factor. Thus, in FIG. 7, an illustrative method is shown in which the size at an edge cache 120 is assumed to be fixed, and the amount of bandwidth available at the edge cache 120 is assumed to be fixed, thereby allowing title dispersion determinations, based on a content request distribution curve or title dispersion function, and the opportunity to manipulate or otherwise adjust the content request distribution curve using a number of factors to predict and control VOD user behavior.

In step 710, the existing cache size, of edge cache 120, for example, is determined. As in the above example, an illustrative edge cache 120 may have a fixed 1 TB cache storage size. In step 720, the number of assets corresponding to the cache size is determined. If edge cache 120 is 1 TB in size (step 710), and a determination is made that the average asset size in the content library is 5 GB, then the edge cache 120 may have the capacity to store 200 average-sized assets (step 720). In step 730, the amount of bandwidth available at the edge cache 120 is determined, and in step 740, a number of assets that may be transferred based on the available bandwidth is determined. As discussed above, this bandwidth determination may correspond to the portion of the CDN available to transfer requested assets from the central content library 100 (or a middle-tier cache 110) to the edge cache 120. For example, as discussed above example, the available bandwidth at an illustrative edge cache 120 may correspond to the bandwidth sufficient to simultaneously stream 160 assets.

Based on the cache size and bandwidth determinations in steps 710-740, title dispersion data may be analyzed in step 750 (e.g., CDN-wide title dispersion data, or data with respect to the specific edge cache). The title dispersion analysis in step 750 may involve accessing a content request distribution curve or executing an equation based on such a curve to determine percentage of content requests associated with a fixed number of asset titles, or vice versa. Additionally, the title dispersion analysis in step 750 may take into account an anticipated or desired number of asset requests to be supported (e.g., simultaneously) at the edge cache 120 and/or a level of desired level of service for the VOD CDN users. For example, the VOD or CDN manager may anticipate that edge cache 120 is likely to receive as many as 600 simultaneous asset requests from its client devices during a peak time. In order to support all of the 600 simultaneous asset requests, the edge cache 120 would need to have an adequate cache size and/or sufficient available bandwidth. Referring to the above example, it was determined in step 720 that 200 average-sized assets could be stored at the edge cache 120, and it was determined in step 740 that edge cache 120 has the bandwidth available to simultaneously stream 160 assets. Therefore, continuing on to step 750, a title dispersion function in this example may determine that the most popular 200 assets (i.e., the maximum number of assets that may reside in the cache) should account for 60% of the asset requests received at edge cache 120. Thus, 360 of the 600 simultaneous asset requests that edge cache 120 may receive at a peak time could potentially be provided to client devices from the cache storage without needing to download the requested asset from the central content library 100. In this example, the remaining 240 asset requests might need to be streamed from central content library 100. However, in this example it was determined in step 740 that the edge cache 120 only has the bandwidth availability to simultaneously stream 160 assets, thus leaving 80 asset requests that the edge cache 120 might not be able to respond to in a sufficiently timely manner.

Therefore, in step 760 the content request distribution curve analyzed in step 750 may be manipulated or adjusted through a number of different techniques, allowing the edge cache 120 to potentially be able to respond to an additional number (or all) of asset requests. For instance, an administrator of the VOD or CDN system may decide to more prominently advertise the most popular titles in the library, may lower the ordering price of those titles for users, or may provide users with other incentives to select those titles, thus increasing the percentage of overall requests corresponding to the most popular titles. Similarly, techniques may be used within the VOD CDN system to disincentivize customers from ordering other titles, such as altering certain prices, reducing certain investments in advertising, or by removing some titles altogether from the available title list shown to users. Continuing the above example, the VOD administrator in step 760 may decide to increase the advertising efforts on the most popular titles in the VOD system, and as a result, the content request distribution curve may change so that the same 200 assets stored in the edge cache 120 will account for 75% of the asset requests received by the edge cache 120 (up from the 60% determined above in step 750). Therefore, in this example, based on the manipulation performed in step 760, the edge cache 120 would be able to provide 450 of the 600 simultaneous asset requests received at a peak time from the cache storage, thus leaving only 150 assets that may need to be streamed from central content library 100. Since the edge cache 120 in this example has bandwidth availability to simultaneously stream 160 assets, all 600 simultaneous asset requests could therefore be responded to in a sufficiently timely manner. Thus, in the illustrative example shown in FIG. 7, a CDN may be configured (e.g., in order to improve customer service, or make better use of existing CDN cache storage, bandwidth, or other resources) by manipulating the content request distribution curve, without needing to resize the cache devices, and without needed to change the amount of bandwidth available to the cache devices.

Figure 8:
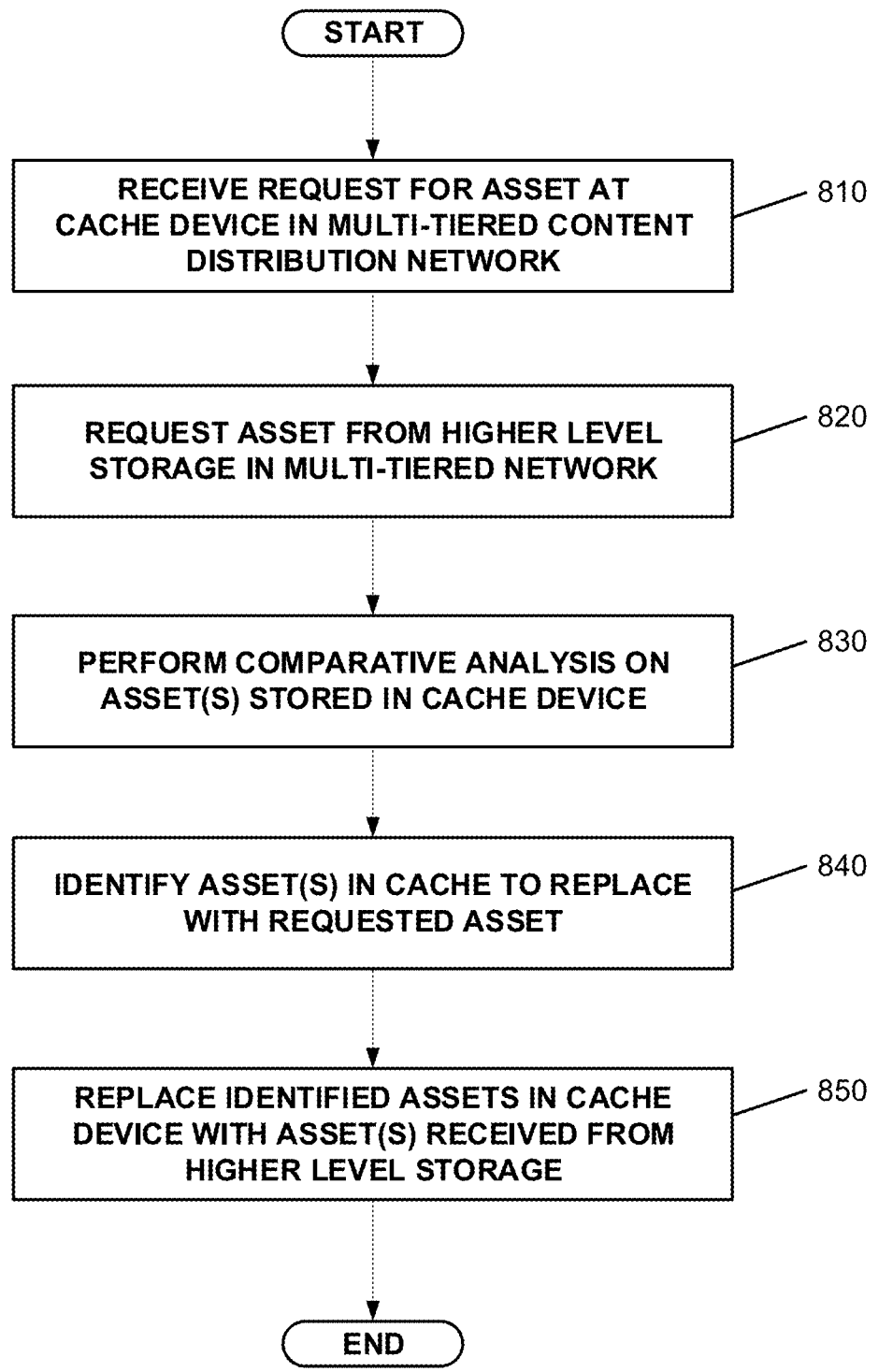
FIG. 8 is a flow diagram showing an illustrative method for replacing assets in a cache in accordance with one or more aspects described herein.

Referring now to FIG. 8, a flow diagram is shown illustrating a technique for replacing assets in a caching device of a CDN in accordance with certain aspects. As described below, FIGS. 8 and 9 both relate to a series of comparative analysis techniques by which the assets in a video on demand (VOD) system are compared and one or more inactive cached assets are identified for replacement based on the size of the assets, past usage, and predicted future requests in the VOD system. Thus, the techniques and examples described in reference to FIG. 8 may apply to, for example, one or more of the middle-tier caches 110, one or more of the edge caches 120, and/or other cache devices in a CDN or similar system. Similar techniques may be used to determine when to remove/replace assets at the central content library 100 of the CDN.

In step 810, a VOD content request is received at a cache device in a content distribution network. For example, a client device 130a may request a VOD asset (e.g., movie, television program, music video, software application, etc.) from an associated edge cache 120. Step 810 may also correspond to a request from an edge cache 120 to its middle-tier cache 110, for an uncached VOD asset that has been requested by a client device 130a. In this example, the cache device receiving the VOD asset request (e.g., edge cache 120 or middle-tier cache 110) determines that the requested asset is not stored locally in the memory of the cache device. Therefore, in step 820, the cache device requests the asset from a higher level cache, or from the central content library 100 in the CDN. In a multi-tier cache CDN, the higher level caches that are closer to the central content library 100 may be increasingly larger to store more assets than the caches below them in the hierarchy. Thus, a requested asset that is not cached at an edge cache 120 might be found at the next higher level cache, or the next higher level cache, and so on, before the requested asset must ultimately be retrieved from the central content library 100.

Although not shown in FIG. 8, the requested asset may be provided to the client device 130a through the levels of the CDN hierarchy after the asset is retrieved from the higher level cache storage. Additionally, at each caching level along the asset retrieval path, the caching devices may decide to add the newly retrieved asset to the cache storage. If there is sufficient unused memory at a device caching the retrieved asset, the determination may be quite simple. However, if the cache memory is full or does not contain sufficient unused memory to store the retrieved asset, then the decision to cache the newly received asset requires deciding which asset(s) currently stored in the cache should be deleted to make room in the cache. Steps 830-850 relate to the determination of whether or not to replace existing cached assets with a newly retrieved asset, and which existing cached assets will be replaced.

In step 830, the cache device (e.g., edge cache 120) performs a comparative analysis on the assets stored in its cache memory. Several examples of comparative analysis algorithms are described below, and it should be understood that the inventive concepts described herein are not limited to any one technique but encompass all possible combinations of these techniques. For example, one of many possible techniques is discussed below in reference to FIG. 9, in which a combination of several different comparative analysis algorithms is used to determine which of the existing cached assets (e.g., inactive assets) will be replaced. The techniques used for determining whether or not to replace one or more asset(s) in the memory of the edge cache 120, and which asset(s) to replace, include the following.

Asset Popularity Analysis

A first set of techniques for comparing cached assets relates to the popularity of the assets, that is, how often and how frequently the cached assets have been requested by previous client device requests. A simple implementation of an asset popularity algorithm might include maintaining a data table at a cache device (e.g., edge cache 120) to track the number of times that each of its cached items have been requested by a client device 130a. In this example, the asset selected for replacement may correspond to the least requested asset in the cache. In other implementations, the asset popularity table may correspond to a certain recent time period, e.g., over the last hour, the last day, the last seven days, etc., so that older asset requests are not considered or are weighted less than more recent requests. For instance, an asset request table may be subtracted from periodically, or divided by a degradation factor, to effectively scale the data to favor recent asset requests over older requests. By tracking and storing the number of times each VOD asset in the cache has been requested over a prior time period (e.g., day, week, month, etc.), it is possible to compare the relative popularity of one asset versus another.

In certain examples, asset popularity may be measured and/or weighted according to different times of day, or dayparts, that the previous requests were made, so that assets that are more popular in a current daypart are more likely to be retained in the cache. A daypart may correspond to a block of time at which a request for a certain type of VOD content and/or a certain user demographic is more likely. One example set of dayparts, each having associated times of day, might include: 'Before Work', 'Morning', 'Late Morning', 'Lunchtime', 'Early Afternoon', 'After School', 'After Work', 'Primetime', 'After Primetime', 'Late Night', etc. In this example, a data table may be maintained to track the number of requests of cached assets in each different daypart, and an asset replacement determination may select (or weight) the least requested assets in the current daypart(s) and/or in adjacent or nearby daypart(s). Thus, the popularity of cached assets in different dayparts might be weighted less, or might not be considered at all, during an asset replacement determination.

Additionally, in certain examples, an asset popularity calculation may take into account the popularity of related assets. For example, an edge cache 120 might store multiple copies of the same VOD asset at multiple different bit rates (e.g., standard definition (SD), high definition (HD)), and may consider the overall popularity of the VOD content by summing the requests from all bit rates. In other examples, other relationships between assets may depend on the title, series, author, or genre of the cached assets. For instance, popularity of a cached episode of a television program may be taken into account when evaluating the other episodes of the same program stored in the edge cache 120.

In certain examples, the popularity of assets may be measured solely from the perspective of the cache device making the asset replacement determination. However, in other examples, the popularity of assets in other 'communities' may be considered as well. For example, an edge cache 120 may perform a popularity analysis on its cached assets using data received from its middle-tier cache 110, the central content library 100, and/or from other devices in the CDN configured to track and store popularity data.

Multiple Asset Popularity Analysis

After deciding that a newly retrieved asset should be added to a local cache, a determination may be made to remove a single inactive asset from the cache, or to remove a combination of inactive assets. Using a multiple asset popularity analysis, the newly retrieved asset may replace, in the cache, a combination of assets having an equal or greater size than the newly retrieved asset, where the combination of assets has a relatively small number of combined asset requests. For example, an edge cache 120 may retrieve an asset from the central content library 100 that is 82 minutes in the length and standard definition (e.g., 3.75 Mbps). In this example, a group of replacement standard definition (e.g., 3.75 Mbps) assets might have lengths of 6 minutes, 8 minutes, 10 minutes, 15 minutes, 20 minutes, 25 minutes (total >82). Alternatively, a group of replacement high definition (e.g., 15 Mbps) assets might have lengths of 6 minutes, 7 minutes, and 8 minutes (total 21 minutes). The combination of replacement assets might also be a mix of standard definition and high definition assets.

In the multiple asset popularity analysis, an algorithm may be implemented by a discard candidate selector software component to identify the combination of assets that has the least number of requests since a request counter was last reset. For example, a request counter might be stored to track the number of requests for each asset in the cache. The request counter may be reset periodically (e.g., daily, weekly, monthly), so that the counter may differentiate between cached assets that were formerly popular, from those assets that are currently popular. The discard candidate selector may be configured to select the combination of assets (or single asset) having the least number of combined asset requests, and with at least the size of the asset to be cached. In certain implementations, the discard candidate selector software component may be configured to prefer high definition assets to standard definition assets, or vice versa. For example, the request counter may be incremented by different amounts for high definition assets than for standard definition assets. Additionally, the request counters for the cached assets may be implemented as degrading variables, so that the value corresponding to each asset will be periodically decremented. In these examples, a preference for either high definition assets or standard definition assets may be implemented by degrading the variables for high definition/standard definition assets at different rates, or by different amounts. Degrading variables for request counters may be used instead of, or in addition to, periodic counter resets.

All High Definition/All Standard Definition Analysis

As mentioned above, in a single asset popularity analysis or multiple asset popularity analysis, asset bit rate may be considered as a variable to weight the popularity determination. Additionally, an edge cache 120 may implement an all high definition, or all standard definition analysis, in which no weight is given to asset popularity between assets of different bit rates. In this type of analysis, all inactive assets of a first bit rate (e.g., high definition) will be deleted from the cache before any assets of a second bit rate (e.g., standard or other lower definition) are deleted. A similar technique may be implemented for deleting all inactive standard definition assets before any high definition assets are deleted, and/or may be implemented for multiple (e.g., 3, 4, 5, etc.) different bit rate classifications. Further, in systems having multiple different types of high definition and standard definition assets (e.g., multiple classifications of high definition assets having different bit rates within a range of high definition), and other types of assets (e.g., various lower bit rates than standard definition), or assets that include a combination of different bit rates during different portions of the programming in the asset, similar analysis techniques may be used to compare these assets on the basis of their bit rate(s). Additionally, as mentioned above, an all high definition or all standard definition analysis may be implemented in combination with the other analyses described herein. For instance, an all high definition asset replacement policy may be used, and then within that policy a single or multiple asset popularity analysis may be implemented to determine which high definition asset(s) to replace next.

Recent History Popularity Analysis

A recent history popularity analysis may be implemented in a similar manner to an overall popularity analysis. However, rather than storing a single popularity counter for each asset to track the number of assets requests since the last counter reset, a recent history popularity analysis may employ multiple counters for each asset corresponding to different recent periods. For example, in one implementation, an edge cache 120 may use 24 different counters to store the number of requests for an asset for each of the previous 24 hours. In this example, the counters may be reset daily, or after multiple days. In another example, an edge cache 120 may maintain 7 counters to store the number of requests for an asset for each of the previous seven days. In this example, the counters may be reset weekly, or after multiple weeks. In yet another example, the edge cache 120 may store a different counter for each asset for each daypart (e.g., 'Before Work', 'Morning', 'Late Morning', etc.). In these examples, when determining an asset (or combination of assets) to replace, a software program at the edge cache 120 may be configured to identify current time characteristics (e.g., the current day of the week, current hour, and current daypart), and may query the corresponding counters to determine which asset(s) are least popular for the same time characteristics. For instance, if an asset must be removed from the cache on Tuesday afternoon, at 4:35 pm, the recent history popularity analysis may determine the assets to be replaced by querying the 'Tuesday' asset counters, the 'After School' asset counters, and/or the '4-5 pm' asset counters for each of the assets in the edge cache 120. In this example, the counters may be reset daily, or after multiple days. As another example, the edge cache 120 may use different counters corresponding to different content categories of VOD user requests (e.g., sports, news, movies, games, cartoons, etc.) and these content counters may be used, alone or in conjunction with daypart counters, to better predict which categories of cached assets the client devices 130 are more and less likely to request at certain times. Based on these queries, and/or in combination with the other techniques described herein, assets or asset combinations may be identified that are less likely to be requested in the near future, and thus may be designated for replacement.

Community Popularity Analysis

In a community popularity analysis, the popularity (e.g., number of requests) of assets is considered not only at the current cache, but also at other caching devices within the content distribution network (CDN). For example, an edge cache 120 may receive asset popularity data from the central content library 100 and/or other middle tier caches and/or edge caches, rather than relying only on the popularity data of assets at edge cache 120. For instance, a video on demand (VOD) system in a CDN may maintain a separate video server at the central content library 100 to store a VOD-wide count of the number of requests for each asset in the VOD system. Then, any middle-tier cache 110 or edge cache 120 may query the central content library 100 to retrieve the request count for any locally cached assets. Thus, the single asset popularity and/or multiple asset popularity analyses described above may be implemented using VOD-wide popularity data. In certain examples, an edge cache 120 may treat the data retrieved from the off-platform server as the only measurement of asset popularity. In other examples, the VOD-wide data may be used in combination with local counters (e.g., by combing an off-platform popularity calculation with the local counters using the same weight or different weights), or by 'priming' the local counters (e.g., providing the initial counter values after a counter reset) and then incrementing the local counters based on local asset requests received at the edge cache 120.

As mentioned above, in certain examples an off-platform video server may be implemented at the central content library 100 in the VOD CDN to store asset request counts across multiple edge caches 120 and middle-tier caches 110. In other examples, instead of or in addition to the centralized video server, additional servers may be implemented at the middle-tier caches 110 to store the asset request counts within the corresponding portions of the VOD CDN. Further, the centralized video server(s) in a VOD CDN need not be located in at the central content library 100 or the middle-tier caches 110, but may be implemented at the individual edge caches 120 or at separate locations accessible via the CDN or via a different network connection (e.g., the Internet). For instance, an Internet accessible video server may be located anywhere within or outside of the VOD CDN, as long as it is configured to allow the edge caches 120 in the CDN to directly connect and to upload/download asset request counter data.

In certain examples, the popularity data in a community popularity analysis may be based on asset requests received at a central location (e.g., the central content library 100, or a middle-tier cache 110). For instance, a video server may increment an asset request counter for each asset request received at the central content library 100 from one of the middle-tier caches 110, and/or for each asset request received at a middle-tier cache 110 from one of its associated edge caches 120. However, in this example, the asset request counter might not reflect the total number of user requests for an asset in the CDN. For instance, when a user requests an asset that is cached at the user's edge cache 120, the edge cache 120 need not request the asset from its middle-tier cache 110. Therefore, in other examples, each edge cache 120 may store the total number of requests for its cached assets and transmit that request counter data to its middle-tier cache 110, central content library 100, and/or directly to the video server. For instance, each edge cache 120 in a CDN may invoke a pre-scheduled software process to periodically transmit its list of currently cached assets, and the number of user requests for each cached asset since the last transmission, to a higher-level server (e.g., central content library 100 or middle tier caches 110) or separate location (e.g., a video server), so that the values from multiple edge caches 120 can be summed and the overall community popularity of assets may be determined.

In certain implementations, a community popularity analysis may be used in combination with one or more of the other cache removal/replacement techniques described herein. For example, community popularity data that is readily accessible may be used as a tiebreaker in selecting a cached asset for replacement when multiple different assets have the same (or similar) results in a local asset popularity analysis. Additionally, a community popularity analysis may be one factor of a multi-factor analysis in which several of the techniques described herein for comparing cached assets are used together. In such a multi-factor analysis, one or more factors may be scored and/or weighted differently than other factors depending on the empirical data from the VOD CDN and the preferences of the CDN administrators.

High Definition Like Standard Definition

A variation that may be used in conjunction with one or more of the analysis techniques described herein relates to combining the analysis for corresponding high definition (HD) and standard definition (SD) assets. For example, if an edge cache 120 has SD and HD versions of the same asset (e.g., movie, television episode, music video) cached in its memory, the popularity analysis of one version of the asset may be relevant for determining the likelihood that the other version of the asset will be requested in the future. For instance, if a popularity analysis technique determines that an SD version of an asset should be removed from the cache, however, the HD version of the same asset has been requested a relatively large number of times, then it may be determined that the SD version should be retained because of the large number of HD requests. Similarly, a cached SD asset that would otherwise be retained in the cache when using a first analysis technique may be removed after determining that the corresponding HD asset has been requested relatively few times. Likewise, cache removal determinations for HD assets may depend on the popularity of their corresponding SD assets. This analysis technique may be similarly applied to systems having multiple different types of bit rates (e.g., multiple different classifications with a range of high definition and/or standard definition bit rates, lower bits than standard definition, assets with combinations of bit rates in different portions of the same asset, etc.)

This variation may be applied to any or all of the other asset comparative analysis techniques described herein. For example, in combination with a community popularity analysis technique, the HD like SD variation may take into account the popularity of corresponding assets from different bit rates (e.g., HD and SD) across multiple different edge caches 120 and/or the entire VOD CDN. As another example, this variation may be used as a tiebreaker in selecting a cached asset for replacement when multiple different assets have the same (or similar) results in another analysis technique. Additionally, this variation may be used as a weighting factor in one or more of the other analysis techniques described herein.

Predetermined Number of Requests Required for Cache Insertion

Another variation that may be used in conjunction with one or more of the analysis techniques described herein includes a rule that requires an asset to be requested at least a predetermined number of times within a certain time window before that asset will be considered as a candidate for addition to a cache in the CDN (e.g., edge cache 120). As discussed above, not every asset requested by and delivered to a VOD user will be added to the cache(s) in the VOD CDN. For example, an asset which is rarely requested and is not likely to be requested again in the near future should not be stored in a CDN cache in many scenarios. Therefore, according to this variation, each asset must be requested at least N times (e.g., at least 2 times, 3 times, 4 times, . . . , 10 times, etc.) before it will be considered for storage in a CDN cache. As an example implementing this variation, one or more edge caches 120 may maintain a request counter for any requested and delivered asset that is not currently stored in the memory of the cache. For instance, an edge cache 120 may be programmed never to cache an asset unless that asset has been requested at least twice from the edge cache 120. Additionally, the request counter for uncached assets may be reset periodically (e.g., hour, daily, weekly), so that an unpopular asset that is requested only once a week will never be added to the cache. Uncached asset counters may also be based on the number of users that request an asset. For instance, an uncached asset may have a user request counter and may only be eligible for addition to a cache when N number of different users have requested the asset.

When one or more assets are deleted from a cache device, request counters may be created for the newly uncached items. The newly uncached assets may have their counters reset to zero, or the newly uncached assets may be favored somewhat by initially assigning a non-zero value to the request counters for these assets. This variation may also be combined with the other analysis techniques described herein. For example, an uncached asset request counter may be maintained at a community level (e.g., at a higher level cache server, the central content library 100 or middle tier cache 110, or at an off-platform video server).

Figure 9:
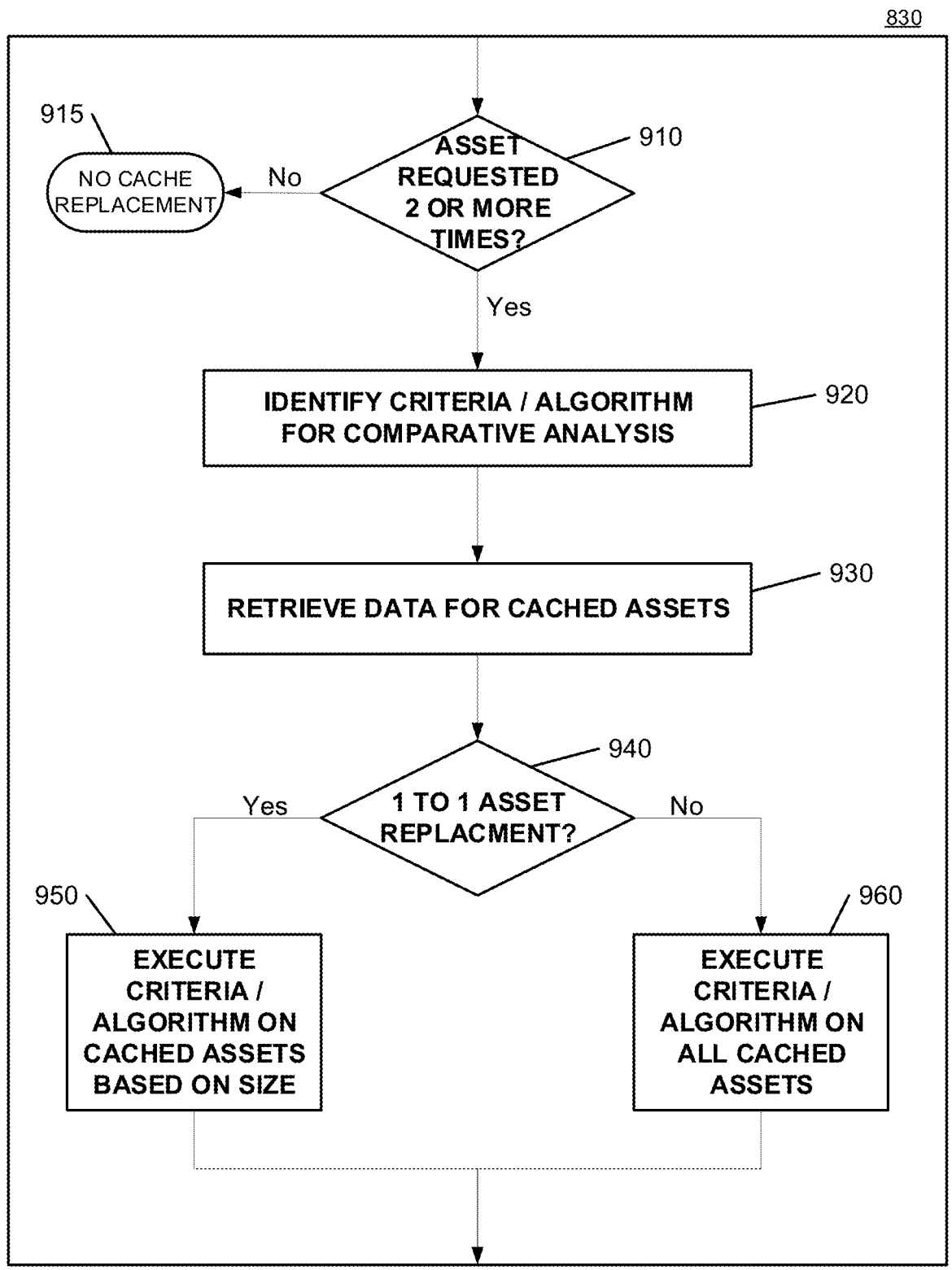
FIG. 9 is a detailed portion of the flow diagram of FIG. 8 showing an illustrative method for performing a comparative analysis on assets in a cache in accordance with one or more aspects described herein.

Referring to FIG. 9, an illustrative technique is shown for performing a comparative analysis of assets in a cache using, for example, a combination of the analysis techniques discussed above. The example algorithm shown in FIG. 9 represents just one of many different possible comparative analysis techniques that may be performed in step 830 of FIG. 8. For illustrative purposes, the simplified sample cached assets table shown in FIG. 10 will be referenced during the discussion of the steps of the comparative analysis in FIG. 9.

In step 910 of the comparative analysis, a determination is made whether the currently requested asset has been requested at least two times. Step 910 may implement a rule restricting insertion into a cache, as discussed in the 'Predetermined Number Of Requests Required For Cache Insertion' section above. In this example, a cache device (e.g., edge cache 120) may maintain a request counter for all uncached assets, and if an asset has only been requested once or not at all (910:No), then step 915 will be invoked and no replacement of any item in the edge cache 120 will be performed.

In this example, if a requested asset is not currently cached and the asset has been requested by a user two or more times (910:Yes), then the asset will be inserted into the edge cache 120. Steps 920-960 do not describe the insertion of the requested asset into the cache, but rather relate to identifying one or more inactive assets currently stored in the cache (e.g., FIG. 10) that will be deleted to allow the new asset to be cached. In step 920, the criteria and algorithm that will be used for the comparative analysis are identified. As discussed above, any of the comparative analysis techniques, such as those described herein (e.g., single asset popularity, multiple asset popularity, recent history popularity, community popularity, etc.), may be used in any possible combination. The decision of which analysis technique(s) to use may be made at the level of the individual edge cache 120, or at a higher level (e.g., tier-wide, CDN-wide, etc.). For example, CDN administrators may determine that every edge cache 120 in CDN will operate the same software program that implements a combination of the above popularity analyses. In other examples, CDN administrators may determine that some edge caches 120 will execute a first algorithm and use a first set of criteria for cache replacement determinations, while other edge caches 120 will execute a second algorithm and use a second set of criteria. For instance, if one set of edge caches 120 is more closely connected via the communication networks in the CDN, these edge caches 120 may have better access a common off-platform video server and thus may implement an algorithm that involves more frequent communication with the common off-platform video server.

After identifying the algorithm and the criteria that will be used to compare the assets in the cache in step 920, the relevant data for the cached assets may be retrieved in step 930. Although step 930 need not occur after step 920, it may be advantageous in certain examples to retrieve only a subset of the data stored in the cached asset data table (e.g., FIG. 10) that is relevant to the algorithm/criteria identified in step 920. For example, if a simple asset popularity analysis is used, then the data describing the asset type (e.g., 'Asset Type' 1050), the data storing the number of requests in the current daypart (e.g., '# Req Daypart' 1070) need not be retrieved in step 930. In certain implementations, a cached asset data table (e.g., FIG. 10), may include only the information required for the cache replacement comparative analysis, while in other implementations additional information may be stored in this table and used for other purposes. Storing additional information in this table may also allow an edge cache 120 to be quickly reconfigured to use a different algorithm/criteria for determining cache asset replacements.

After retrieving the relevant data for each cached asset in step 930, the determination is made in step 940 whether the edge cache 120 will perform a one-to-one asset replacement, or whether multiple asset replacement scenarios will be considered. If an edge cache 120 is configured to perform only one-to-one asset replacement (940:Yes), then the execution in step 950 might only analyze the assets in the cache having an equal or larger size to the new asset that will be inserted into the cache. That is, in one-to-one asset replacement (940:Yes), the potential removal candidates may need to be greater in size the incoming asset, therefore, only the subset of larger assets in the cache might be analyzed. Using the example asset cache in FIG. 10, if an incoming asset to the cache had a size of 5 GB, then using one-to-one asset replacement in step 950, only the assets larger than 5 GB (i.e., 1001-1004, 1009-1011) would need to be analyzed as potential removal candidates, and the assets smaller than 5 GB (i.e., 1005-1008, 1012) would not need to be analyzed. It should be noted that in one-to-one assets replacements, the minimum size of a potential removal candidate might not be exactly the same size as the incoming asset. For example, even a full cache might have a small amount of available storage space, therefore, the minimum size of a potential removal candidate might be the size of the incoming asset minus the size of the currently available cache space.

In step 940, if the edge cache 120 is configured to support a many-to-one asset replacement technique (940:No), then the execution in step 960 might analyze all assets in the cache regardless of whether they are larger or smaller than the new asset that will be inserted into the cache. That is, in a many-to-one asset replacement (940:No), the comparative analysis in step 960 evaluates potential removal candidates as combinations of assets whose sizes may be summed to create enough space in the cache for the incoming asset. Using the example asset cache in FIG. 10, if an incoming asset to the cache had a size of 20 GB, then a many-to-one asset replacement in step 960 would analyze not only the assets larger than 20 GB (i.e., 1001, 1002, 1004) individually as potential removal candidates, but may also analyze each possible combination of the other smaller assets (i.e., 1003, 1005-1012) as potential removal candidate combinations. In this example, if a simple overall asset popularity analysis were used, then each of the assets larger than 20 GB (i.e., 1001, 1002, 1004) would be compared by their respective overall popularity (i.e., column 1008) to determine that the least popular removal candidate >20 MB is asset 1004 having an overall popularity of 2,568. As discussed above, this '#Req Total' number may correspond to, for example, a total number of user requests across the CDN over a period of time, a degraded or scaled number of user requests, or a calculated variable representing popularity of the asset based on user requests and other data (e.g., popularity of corresponding bit rate assets, weighted popularity in different geographic regions, etc.) After determining the least popular single asset >20 MB (1004) as a potential removal candidate, the many-to-one asset replacement algorithm executing in step 960 may identify and evaluate combinations of multiple assets that might be replaced instead of the single asset 1004. For example, by summing the popularities of the asset combinations, the edge cache 120 may determine in step 960 that the combination of assets 1003, 1006, and 1008 are less popular combined than the single asset 1004. Therefore, since this combination of assets is also larger than 20 GB, the comparative analysis in step 960 may identify the combination of 1003, 1006, and 1008 to be removed.

In certain implementations, techniques using one-to-one asset replacement (940:Yes) may provide potential advantages during the retrieval of data in step 930 and the execution of the comparative analysis in step 950. For example, in one-to-one asset replacement, data corresponding to smaller assets need not be retrieved in step 930. Additionally, the comparative analysis (e.g., popularity analysis) in step 950 may be simpler when comparing single assets rather than combinations of assets.

Similarly, other potential advantages may be associated with the execution of a many-to-one (940:No) asset replacement algorithm in step 960. For instance, as discussed above, many-to-one asset replacement techniques may identify combinations of smaller assets that should be replaced and that would not be considered in one-to-one asset replacement. Additionally, a many-to-one asset replacement in step 960 may allow edge caches 120 to better maintain a desired size distribution of cached assets. That is, well known cache replacement inefficiencies may result in certain instances when too many assets in the cache have approximately the same size. For example, may be wasteful to remove a large asset from the cache (e.g., SD or HD movie) to make room for a much smaller asset (e.g., music video, software program), however, if the cache reaches a state where very no small assets (or very few) are cached then it may be necessary to inefficiently replace much larger asset. To avoid this situation, a many-to-one asset replacement algorithm in step 960 may implement a 'preference' to maintain a balanced distribution of assets of many different sizes (e.g., SD and HD assets, movies, TV episodes, music videos, games, etc.). For instance, if multiple different combinations of assets have approximately the same result in a comparative popularity analysis, then the edge cache 120 may elect to remove the combination that preserves the most desired size distribution of remaining assets in the cache.

As will be appreciated by one of skill in the art upon reading the following disclosure, various aspects described herein may be embodied as methods, systems, apparatus and/or computer program products Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. For example, in FIG. 2, a processor for executing the computer-executable instructions is shown as 202, and computer-executable instructions may be implemented as software in memory 204, 206, and/or 208.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

The invention claimed is:

1. A method comprising:
   causing, by a computing device, storage of a plurality of content items in a first storage location by:
   determining, based on request history information, a first target percentage of content item requests to be serviced by the first storage location;
   ranking a plurality of unique titles, in the request history information, to generate a list of top ranked unique titles, wherein each unique title corresponds to a percentage of a total number of historical content item requests;
   iteratively selecting, after determining the first target percentage, by starting from a top of the list of top ranked unique titles, a quantity of unique titles until a sum of the percentages for each of the iteratively selected unique titles satisfies the first target percentage; and
   causing storage, based on the selecting and in the first storage location, of the iteratively selected unique titles.

2. The method of claim 1, wherein causing the storage of the iteratively selected unique titles is further based on a plurality of distribution curves at a plurality of different time intervals associated with the first storage location.

3. The method of claim 1, wherein causing the storage of the iteratively selected unique titles is further based on:
an available bandwidth between the first storage location and a second storage location, and
a cache size of the first storage location.

4. The method of claim 1, wherein causing the storage of the iteratively selected unique titles is further based on a quantity of target unique titles satisfying the first target percentage of content item requests, and wherein the first target percentage is based on a time of day.

5. The method of claim 1, wherein causing the storage of the iteratively selected unique titles is further based on a quantity of target unique titles satisfying the first target percentage of content item requests, and wherein the quantity of target unique titles is based on a time of day.

6. The method of claim 1, wherein causing the storage of the iteratively selected unique titles is further based on giving different weights to requests from different users in the request history information.

7. The method of claim 1, further comprising:
causing the storage of the iteratively selected unique titles further based on:
rankings of unique titles in the request history information; and
frequencies of access.

8. The method of claim 1, wherein for each iterative selection of unique titles, a running sum of percentages is updated and compared against the first target percentage.

9. The method of claim 1, further comprising:
receiving title dispersion criteria for the first storage location, wherein the title dispersion criteria comprise:
a minimal quantity of target unique titles that are to account for a percentage of requests;
selecting, based on the title dispersion criteria and to be stored in the first storage location, the minimal quantity of target unique titles from the request history information; and
sending an instruction to cause the minimal quantity of target unique titles to be stored in the first storage location.

10. The method of claim 1, wherein causing the storage of the iteratively selected unique titles comprises causing storage of a subset of the iteratively selected unique titles in the first storage location.

11. The method of claim 1, wherein the iteratively selecting further comprises:
sequentially moving down from the top of the list of top ranked unique titles;
maintaining a running total of percentages of previously selected unique titles until the sum of the percentages for each of the iteratively selected unique titles satisfies the first target percentage; and
delivering the iteratively selected unique titles to a plurality of client devices.

12. The method of claim 1, wherein causing the storage of the iteratively selected unique titles is further based on:
an available bandwidth between the first storage location and a second storage location at different time instances of a time interval.

13. A method comprising:
receiving, by a computing device, title dispersion criteria for a cache, wherein the title dispersion criteria comprise:
a quantity of target unique titles, and
a quantity of requests;
receiving, by the computing device, request history information for a plurality of unique titles;
selecting, based on the title dispersion criteria, a subset of the plurality of unique titles to be stored in the cache by:
determining, based on the request history information, a first quantity of requests to be serviced by the cache; and
iteratively selecting, after determining the first quantity of requests and starting from a top of a list of top ranked unique titles that are ranked according to a frequency of access, the subset of the plurality of the unique titles until a sum of quantities of historical requests for each of the unique titles in the iteratively selected subset satisfies the first quantity of requests; and
sending an instruction to cause the iteratively selected subset to be stored in the cache.

14. The method of claim 13, wherein the title dispersion criteria are based on:
the quantity of target unique titles satisfying the quantity of requests.

15. The method of claim 13, wherein iteratively selecting the subset of the plurality of the unique titles comprises selecting a minimal quantity of target unique titles satisfying the first quantity of requests to be serviced by the cache.

16. The method of claim 13, wherein iteratively selecting the subset of the plurality of the unique titles comprises:
ranking the plurality of unique titles, of the request history information, to generate the list of top ranked unique titles, wherein each of the plurality of unique titles corresponds to a percentage of a total number of historical content item requests; and
comparing the sum of the quantities for each of the unique titles in the iteratively selected subset with the first quantity of requests.

17. The method of claim 13, wherein the title dispersion criteria are based on the quantity of target unique titles satisfying the quantity of requests, and wherein the quantity of requests is based on a time of day.

18. The method of claim 13, wherein the title dispersion criteria are based on the quantity of target unique titles satisfying the quantity of requests, and wherein the quantity of target unique titles is based on a time of day.

19. The method of claim 13, wherein the title dispersion criteria are based on:
rankings of the plurality of unique titles; and
frequencies of access.

20. The method of claim 13, wherein for each iterative selection of unique titles, a running sum of the percentages is updated and compared against a first target percentage.

21. A system comprising:
a first computing device;
wherein the first computing device comprises:
one or more processors; and
memory storing instructions that, when executed by the one or more processors of the first computing device, cause the first computing device to:
cause storage of a plurality of content items in a first storage location by:
determining, based on request history information, a first target percentage of content item requests to be serviced by the first storage location;
ranking a plurality of unique titles, in the request history information, to generate a list of top ranked unique titles, wherein each unique title corresponds to a percentage of a total number of historical content item requests;

iteratively selecting, after determining the first target percentage, by starting from a top of the list of top ranked unique titles, a quantity of unique titles until a sum of the percentages for each of the iteratively selected unique titles satisfies the first target percentage; and causing storage, based on the selecting and in the first storage location, of the iteratively selected unique titles.

22. The system of claim 21, wherein the instructions stored in the memory of the first computing device, when executed by the one or more processors of the first computing device, cause the first computing device to cause the storage of the iteratively selected unique titles further based on:
an available bandwidth between the first storage location and a second storage location, and
a cache size of the first storage location.

23. The system of claim 21, wherein the instructions stored in the memory of the first computing device, when executed by the one or more processors of the first computing device, cause the first computing device to cause of the storage of the iteratively selected unique titles further based on a quantity of target unique titles satisfying the first target percentage of content item requests, and wherein the first target percentage is based on a time of day.

24. The system of claim 21, wherein the instructions stored in the memory of the first computing device, when executed by the one or more processors of the first computing device, cause the first computing device to cause the storage of the iteratively selected unique titles further based on a quantity of target unique titles satisfying the first target percentage of content item requests, and wherein the quantity of target unique titles is based on a time of day.

25. The system of claim 21, wherein the instructions stored in the memory of the first computing device, when executed by the one or more processors of the first computing device, cause the first computing device to cause the storage of the iteratively selected unique titles further based on giving different weights to requests from different users in the request history information.

26. The system of claim 21, wherein the instructions stored in the memory of the first computing device, when executed by the one or more processors of the first computing device, cause the first computing device to:
cause the storage of the iteratively selected unique titles further based on:
rankings of unique titles in the request history information; and
frequencies of access.

27. The system of claim 21, wherein for each iterative selection of unique titles, a running sum of the percentages is updated and compared against the first target percentage.

28. The system of claim 21, wherein the instructions stored in the memory of the first computing device, when executed by the one or more processors of the first computing device, cause the first computing device to:
receive title dispersion criteria for the first storage location, wherein the title dispersion criteria comprise a minimal quantity of target unique titles that are to account for a percentage of requests;
select, based on the title dispersion criteria and to be stored in the first storage location, the minimal quantity of target unique titles from the request history information to be stored in the first storage location; and
send an instruction to cause the minimal quantity of target unique titles to be stored in the first storage location.

29. A system comprising:
a computing device and a cache;
wherein the computing device comprises:
one or more processors; and
memory storing instructions that, when executed by the one or more processors of the computing device, cause the computing device to:
receive title dispersion criteria for the cache, wherein the title dispersion criteria comprise:
a quantity of target unique titles, and
a quantity of requests;
receive request history information for a plurality of unique titles;
select, based on the title dispersion criteria, a subset of the plurality of unique titles to be stored in the cache by:
determining, based on the request history information, a first quantity of requests to be serviced by the cache; and
iteratively selecting, after determining the first quantity of requests and starting from a top of a list of top ranked unique titles that are ranked according to a frequency of access, the subset of the plurality of the unique titles until a sum of quantities of historical requests for each of the iteratively selected unique titles in the subset satisfies the first quantity of requests; and
send an instruction to cause the iteratively selected subset to be stored in the cache, and
wherein the cache comprises:
one or more processors; and
memory storing instructions that, when executed by the one or more processors of the cache, cause the cache to:
receive, from the computing device, the instruction to cause the iteratively selected subset to be stored in the cache.

30. The system of claim 29, wherein the title dispersion criteria are based on:
the quantity of target unique titles satisfying the quantity of requests.

31. The system of claim 29, wherein the instructions stored in the memory of the computing device, when executed by the one or more processors of the computing device, cause the computing device to iteratively select the subset of the plurality of the unique titles by selecting a minimal quantity of target unique titles satisfying the first quantity of requests to be serviced by the cache.

32. The system of claim 29, wherein the instructions stored in the memory of the computing device, when executed by the one or more processors of the computing device, cause the computing device to iteratively select the subset of the plurality of the unique titles by:
ranking the plurality of unique titles, of the request history information, to generate the list of top ranked unique titles, wherein each of the plurality of unique titles corresponds to a percentage of a total number of historical content item requests; and
comparing the sum of the quantities for each of the unique titles in the iteratively selected subset with the first quantity of requests.

33. The system of claim 29, wherein the title dispersion criteria are based on the quantity of target unique titles satisfying the quantity of requests, and wherein the quantity of requests is based on a time of day.

34. The system of claim 29, wherein the title dispersion criteria are based on the quantity of target unique titles satisfying the quantity of requests, and wherein the quantity of target unique titles is based on a time of day.

35. The system of claim 29, wherein the title dispersion criteria are based on:
- rankings of the plurality of unique titles; and
- frequencies of access.

36. The system of claim 29, wherein for each iterative selection of unique titles, a running sum of the percentages is updated and compared against a first target percentage.

\* \* \* \* \*